US012097704B2

(12) United States Patent
Kobayashi et al.

(10) Patent No.: US 12,097,704 B2
(45) Date of Patent: Sep. 24, 2024

(54) PRINTING APPARATUS

(71) Applicant: CANON KABUSHIKI KAISHA, Tokyo (JP)

(72) Inventors: Daisuke Kobayashi, Kanagawa (JP); Kenichi Oonuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 17/550,078

(22) Filed: Dec. 14, 2021

(65) Prior Publication Data

US 2022/0194080 A1 Jun. 23, 2022

(30) Foreign Application Priority Data

Dec. 21, 2020 (JP) ................................ 2020-211291

(51) Int. Cl.
*B41J 2/045* (2006.01)
*B41J 2/14* (2006.01)

(52) U.S. Cl.
CPC ......... *B41J 2/1433* (2013.01); *B41J 2/04553* (2013.01); *B41J 2/04598* (2013.01)

(58) Field of Classification Search
CPC ...................................................... B41J 2/1433
See application file for complete search history.

(56) References Cited

U.S. PATENT DOCUMENTS 7,347,519 B2 3/2008 Nagamura et al.
8,783,832 B2 7/2014 Oonuki et al.
8,888,223 B2 11/2014 Oonuki et al.
9,033,471 B2 5/2015 Oonuki et al.
9,527,278 B2 * 12/2016 Sakurada ............. B41J 2/04573
9,545,791 B2 1/2017 Oonuki et al.
11,186,092 B2 11/2021 Kobayashi et al.
11,207,884 B2 12/2021 Suematsu et al.
2005/0264593 A1 12/2005 Nagamura et al.

FOREIGN PATENT DOCUMENTS

JP 2006-007759 A 1/2006
JP 2016-043636 A 4/2016

* cited by examiner

*Primary Examiner* — Scott A Richmond
(74) *Attorney, Agent, or Firm* — Venable LLP

(57) ABSTRACT

In a case of executing first printing that printing is performed by using a first group, which includes nozzles of a nozzle array whose distances to a detection unit are less than a first predetermined value, and thereafter executing second printing that printing is performed by using a second group, which includes nozzles of the nozzle array whose distances to the detection unit are equal to or less than the first predetermined value and are equal to or more than a second predetermined value, a first driving pulse for the first printing is determined by using a first temperature, which is detected by the detection unit when the first printing is performed. A second driving pulse for the second printing is determined by use of a second temperature, which is derived based on the first temperature and corresponds to a temperature of the nozzles of the second group.

15 Claims, 15 Drawing Sheets

500

| TEMPERATURE | DRIVING PULSE NUMBER |
|---|---|
| LOWER THAN 55 °C | 4 |
| 55 °C OR HIGHER AND LOWER THAN 60 °C | 3 |
| 60 °C OR HIGHER AND LOWER THAN 65 °C | 2 |
| 65 °C OR HIGHER | 1 |

500

| TEMPERATURE | DRIVING PULSE NUMBER |
| --- | --- |
| LOWER THAN 55 °C | 4 |
| 55 °C OR HIGHER AND LOWER THAN 60 °C | 3 |
| 60 °C OR HIGHER AND LOWER THAN 65 °C | 2 |
| 65 °C OR HIGHER | 1 |

FIG.5

| | NOZZLE NUMBER | AVERAGE TEMPERATURE OF NOZZLES | USAGE DURING SCANNING (○: USED) | TEMPERATURE T DETECTED BY Di SENSOR | DRIVING PULSE NUMBER |
|---|---|---|---|---|---|
| BEFORE THE FIRST SCANNING | 0~255 | 50°C | ○ | 50°C | 4 |
| | 256~511 | 50°C | × | | |
| BEFORE THE SECOND SCANNING | 0~255 | 60°C | × | 60°C | 2 |
| | 256~511 | 50°C | ○ | | |

| | NOZZLE NUMBER | AVERAGE TEMPERATURE OF NOZZLES | USAGE DURING SCANNING (○: USED) | TEMPERATURE T DETECTED BY Di SENSOR | Tn | DRIVING PULSE NUMBER |
|---|---|---|---|---|---|---|
| BEFORE THE FIRST SCANNING | 0~255 | 50°C | ○ | 50°C | 50°C | 4 |
| | 256~511 | 50°C | × | | | |
| BEFORE THE SECOND SCANNING | 0~255 | 60°C | × | 60°C | 50°C | 4 |
| | 256~511 | 50°C | ○ | | | |

| | NOZZLE NUMBER | AVERAGE TEMPERATURE OF NOZZLES | USAGE DURING SCANNING (○: USED) | TEMPERATURE T DETECTED BY Di SENSOR | DRIVING PULSE NUMBER |
|---|---|---|---|---|---|
| BEFORE PRINTING ON THE FIRST UNIT AREA | 0~255 | 50°C | ○ | 50°C | 4 |
| | 256~511 | 50°C | × | | |
| BEFORE PRINTING ON THE SECOND UNIT AREA | 0~255 | 60°C | × | 60°C | 2 |
| | 256~511 | 50°C | ○ | | |
| BEFORE PRINTING ON THE THIRD UNIT AREA | 0~255 | 55°C | ○ | 55°C | 3 |
| | 256~511 | 60°C | × | | |

| | NOZZLE NUMBER | AVERAGE TEMPERATURE OF NOZZLES | USAGE DURING SCANNING (○: USED) | TEMPERATURE T DETECTED BY Di SENSOR | CORRECTION VALUE Tofst | Tnew | DRIVING PULSE NUMBER |
|---|---|---|---|---|---|---|---|
| BEFORE PRINTING ON THE FIRST UNIT AREA | 0~255 | 50°C | ○ | 50°C | – | 50°C | 4 |
| | 256~511 | 50°C | × | | | | |
| BEFORE PRINTING ON THE SECOND UNIT AREA | 0~255 | 60°C | × | 60°C | −10°C | 50°C | 4 |
| | 256~511 | 50°C | ○ | | | | |
| BEFORE PRINTING ON THE THIRD UNIT AREA | 0~255 | 55°C | ○ | 55°C | – | 55°C | 3 |
| | 256~511 | 60°C | × | | | | |

PRINTING APPARATUS

BACKGROUND OF THE INVENTION

Field of the Invention

The present invention relates to a printing apparatus that ejects ink to a print medium for printing.

Description of the Related Art

An inkjet printing apparatus that ejects ink from a print head by utilizing thermal energy generated by a heat generation element, such as a heater, to print an image on a print medium is known. Regarding such an inkjet printing apparatus, Japanese Patent Laid-Open No. 2006-7759 and Japanese Patent Laid-Open No. 2016-43636 are disclosed as technologies for suppressing mist and image defects that occur during ink ejection.

Japanese Patent Laid-Open No. 2006-7759 discloses a technology for performing division control that changes the number of times (the number of passes) the print head is made to scan a unit print area on a print medium according to image data. In this division control, when printing such a high-duty image in which printing is performed on approximately 50 to 70% or more of the printable pixel count on the print medium, the number of passes for printing is increased as compared with printing of a non-high-duty image. In Japanese Patent Laid-Open No. 2006-7759, as 2-section division control for performing one-pass printing in two steps, the upper half of a nozzle array of the print head is used for printing in the first scanning, and the lower half of the nozzle array of the print head is used for printing in the second scanning.

Japanese Patent Laid-Open No. 2016-43636 discloses a technology in which a temperature detecting element for detecting the temperature of a print head (or ink) is installed at one end of a nozzle array in which nozzles for ejecting ink are arranged, so as to control a driving pulse, based on the temperature detected by the temperature detecting element.

As described above, in the division control applied in a case of printing a high-duty image, a nozzle array is divided into upper and lower parts for printing, as in Japanese Patent Laid-Open No. 2006-7759. Therefore, in the nozzle array, ink is locally ejected with a high duty, and thus temperature distribution occurs in the nozzle array. Therefore, in a case where a temperature detecting element is installed at one end of a nozzle array in the print head as in Japanese Patent Laid-Open No. 2016-43636, there is a risk that a deviation occurs between the average temperature of the nozzles that eject ink and the temperature detected by the temperature detecting element.

Specifically, in a case of performing printing by use of nozzles in the vicinity of the temperature detecting element in the first scanning of the 2-section division control and by use of nozzles distant from the temperature detecting element in the second scanning, the temperature has almost not increased in the vicinity of the nozzles to be used for the second scanning at the point in time of starting the second scanning. However, due to the printing with the first scanning, the temperature detected by the temperature detecting element is detected higher than the temperature in the vicinity of the nozzles to be used for the second scanning. Therefore, if a driving pulse is set according to the temperature of the temperature detecting element, a driving pulse that is not suitable for the nozzles to be used is selected in the second scanning, and thus, between the first scanning and the second scanning, a difference occurs in the densities of the printed images.

SUMMARY OF THE INVENTION

The present invention has been made in view of the above-described problems, so as to provide a technology capable of appropriately setting a driving pulse according to a distance from a temperature detecting element.

In the first aspect of the present invention, there is provided a printing apparatus including:

- a printing unit configured with a nozzle array, in which a plurality of nozzles that eject ink to a print medium are aligned, and configured to move relative to the print medium in a direction intersecting a direction in which the nozzles are aligned;
- a detection unit configured to detect a temperature of the printing unit; and
- a determination unit configured to determine a driving pulse for ejecting ink, based on the temperature of the printing unit,
- wherein, in a case of executing first printing in which printing is performed by use of a first group, which includes nozzles of the nozzle array whose distances to the detection unit are less than a first predetermined value, and thereafter executing second printing in which printing is performed by use of a second group, which includes nozzles of the nozzle array whose distances to the detection unit are equal to or less than the first predetermined value and are equal to or more than a second predetermined value,
- the determination unit
  - determines a first driving pulse for the first printing by use of a first temperature, which is detected by the detection unit when the first printing is performed, and
  - determines a second driving pulse for the second printing by use of a second temperature, which is different from a temperature detected by the detection unit when the second printing is performed and corresponds to a temperature of the nozzles of the second group.

In the second aspect of the present invention, there is provided a printing apparatus including:

- a printing unit configured with a nozzle array, in which a plurality of nozzles that eject ink to a print medium are aligned, and configured to move relative to the print medium in a direction intersecting a direction in which the nozzles are aligned;
- a detection unit configured to detect a temperature of the printing unit; and
- a determination unit configured to determine a driving pulse for ejecting ink, based on the temperature of the printing unit,
- wherein, in a case of executing first printing in which printing is performed by use of a first group, which includes nozzles of the nozzle array whose distances to the detection unit are less than a first predetermined value, and thereafter executing second printing in which printing is performed by use of a second group, which includes nozzles of the nozzle array whose distances to the detection unit are equal to or less than the first predetermined value and are equal to or more than a second predetermined value, the determination unit determines a first driving pulse for the first printing by use of a temperature detected by the detection unit when the first printing is performed, and determines a driving pulse that is substantially the same as the first driving pulse as a second driving pulse for the second printing.

In the third aspect of the present invention, there is provided a printing apparatus including:

a printing unit configured with a nozzle array, in which a plurality of nozzles that eject ink to a print medium are aligned, and configured to move relative to the print medium in a direction intersecting a direction in which the nozzles are aligned;

a detection unit configured to detect a temperature of the printing unit; and a determination unit configured to determine a driving pulse for ejecting ink, based on the temperature of the printing unit, wherein, in a case of executing first printing in which printing is performed by use of a first group, which includes nozzles of the nozzle array whose distances to the detection unit are less than a predetermined value and does not include nozzles of the nozzle array whose distances to the detection unit are equal to or more than the predetermined value, and thereafter executing second printing in which printing is performed by use of a second group, which includes the nozzles of the nozzle array whose distances to the detection unit are equal to or more than the predetermined value and does not include the nozzles of the nozzle array whose distances to the detection unit are less than the predetermined value, the determination unit determines a first driving pulse for the first printing by use of a first temperature, which is detected by the detection unit when the first printing is performed, and determines a second driving pulse for the second printing by use of a second temperature, which is different from a temperature detected by the detection unit when the second printing is performed and corresponds to a temperature of the nozzles of the second group.

According to the present invention, it is possible to appropriately set a driving pulse according to a distance from a temperature detecting element.

Further features of the present invention will become apparent from the following description of exemplary embodiments with reference to the attached drawings.

BRIEF DESCRIPTION OF THE DRAWINGS

FIG. 5 is a diagram illustrating a correspondence table;

FIG. 9 is a diagram showing a relation between FIGS. 9A and 9B;

DESCRIPTION OF THE EMBODIMENTS

Hereinafter, with reference to the accompanying drawings, detailed explanations will be given of examples of an embodiment of a printing apparatus. Note that it is not intended that the following embodiments limit the present invention, and every combination of the characteristics explained in the present embodiments is not necessarily essential to the solution in the present invention. In addition, the relative positions, shapes, etc., of the configurations described in the embodiments are merely examples and are not intended to limit this invention to the range of the examples.

First Embodiment

Figure 1A:
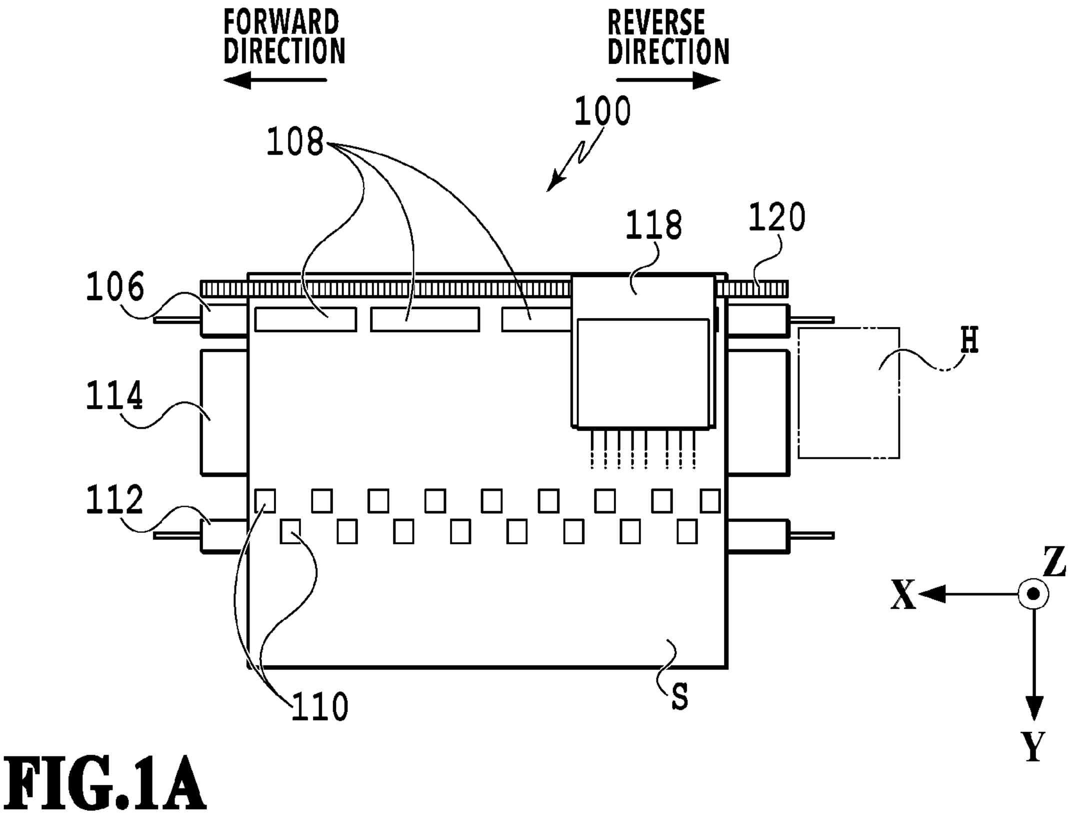
FIG. 1A and FIG. 1B are configuration diagrams of a printing apparatus.
Figure 1B:
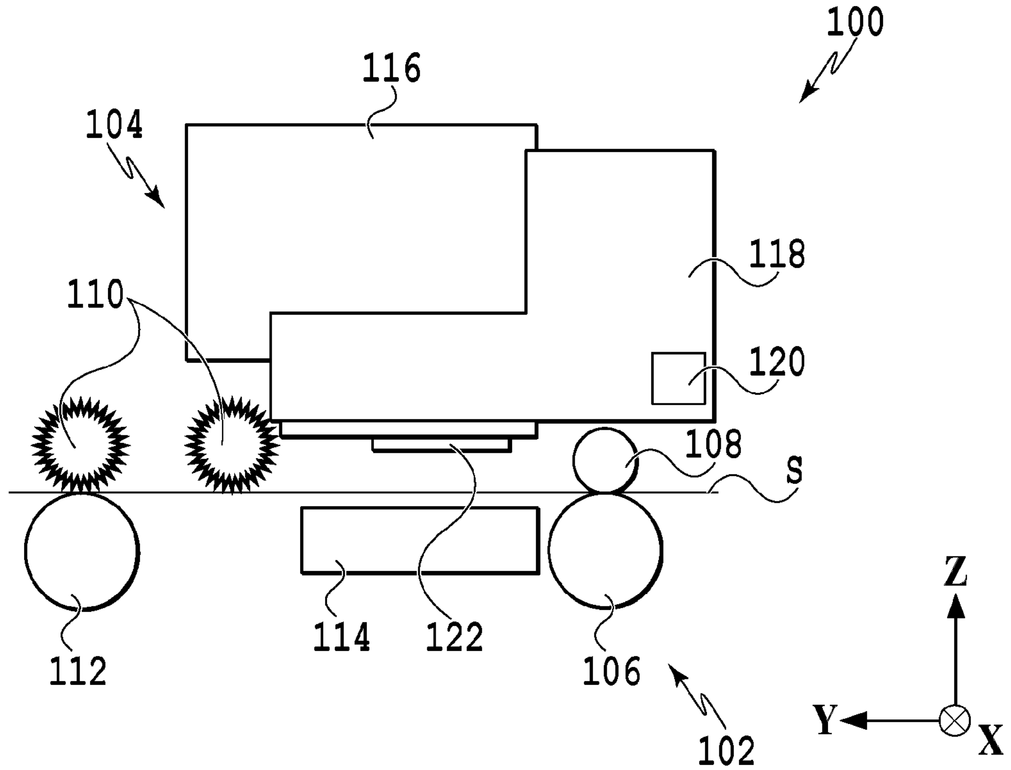

First, with reference to FIG. 1A through FIG. 8C, an explanation will be given of a printing apparatus according to the first embodiment. FIG. 1A is a schematic configuration diagram of a printing apparatus according to an embodiment. FIG. 1B is a side view of the printing apparatus. The printing apparatus 100 of FIG. 1A and FIG. 1B is an inkjet printing apparatus that performs printing by ejecting ink to the sheet-shaped print medium S in an inkjet system.

The printing apparatus 100 is equipped with the conveyance part 102, which conveys the print medium S, and the printing part 104, which performs printing on the conveyed print medium S. The conveyance part 102 is equipped with the conveyance roller 106, which extends in the width direction (the X direction) of the conveyed print medium S, and the pinch roller 108, which makes pressure contact with the conveyance roller 106 to be associated with the conveyance roller 106. The print medium S is nipped by the conveyance roller 106 and the pinch roller 108 and is conveyed in the Y direction which intersects the X direction (orthogonally in the present embodiment). Further, the conveyance part 102 is equipped with the spur 110, which presses the print medium S that is conveyed by the conveyance roller 106, and the discharge roller 112, which discharges the print medium S that is pressed by the spur 110. That is, in the conveyance part 102, the conveyance roller 106 and the pinch roller 108 are located on the upstream side of the print medium S in the conveyance direction relative to the spur 110 and the discharge roller 112.

The printing part 104 is equipped with the platen 114, which supports the conveyed print medium S between the conveyance roller 106 and the discharge roller 112, and the print head 116, in which the print chips 122 (which will be described later) are installed so as to face the platen 114. The print head 116 is configured to be reciprocally movable in the X direction via the carriage 118. The belt 120 is connected to the carriage 118, so that the carriage 118 is configured to move by use of this belt 120. The print head 116 is located at the home position H, which is provided at one end of the X direction, when not performing printing or when performing recovery processing on the print head 116.

Note that, in the present embodiment, although the printing apparatus 100 is configured to eject ink from the print head 116 that moves in the X direction relative to the print medium S which is conveyed in the Y direction, there is not a limitation as such. That is, it is only required that the print head and the print medium S are relatively movable in the direction intersecting the array direction of nozzles, and such a configuration in which one of the print head and the print medium S is fixed is also possible.

The print head 116 is supplied with ink via a tube (not illustrated in the drawings) from an ink tank (not illustrated in the drawings) that stores ink. For example, in the present embodiment, the print head 116 is configured to eject black (Bk) ink, cyan (C) ink, magenta (M) ink, and yellow (Y) ink. Further, the print head 116 is equipped with the print chips 122 which are installed at positions corresponding to the platen 114 when being mounted on the carriage 118. The print chips 122 include the print chip 122*a*, in which an array of multiple nozzles for ejecting Bk ink is arranged, and the print chip 122*b*, in which arrays of multiple nozzles for ejecting the C ink, M ink, and Y ink, respectively, are arranged (see FIG. 2B).

Figure 2A:
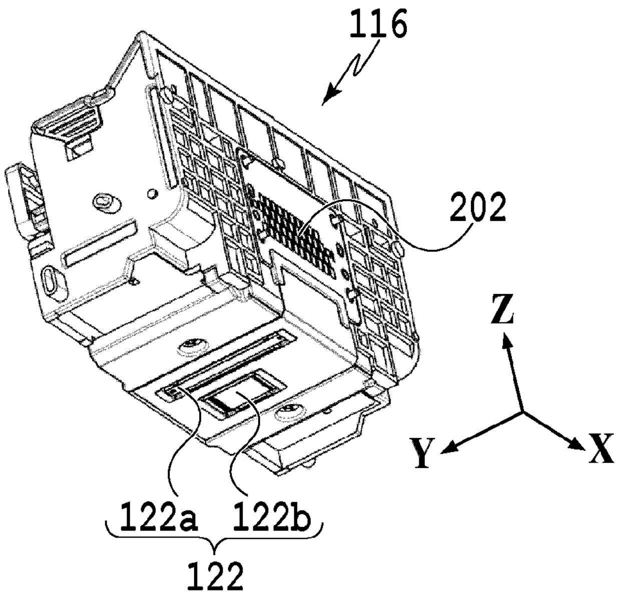
FIG. 2A to FIG. 2D are diagrams for explaining the configuration of a print head.
Figure 2B:
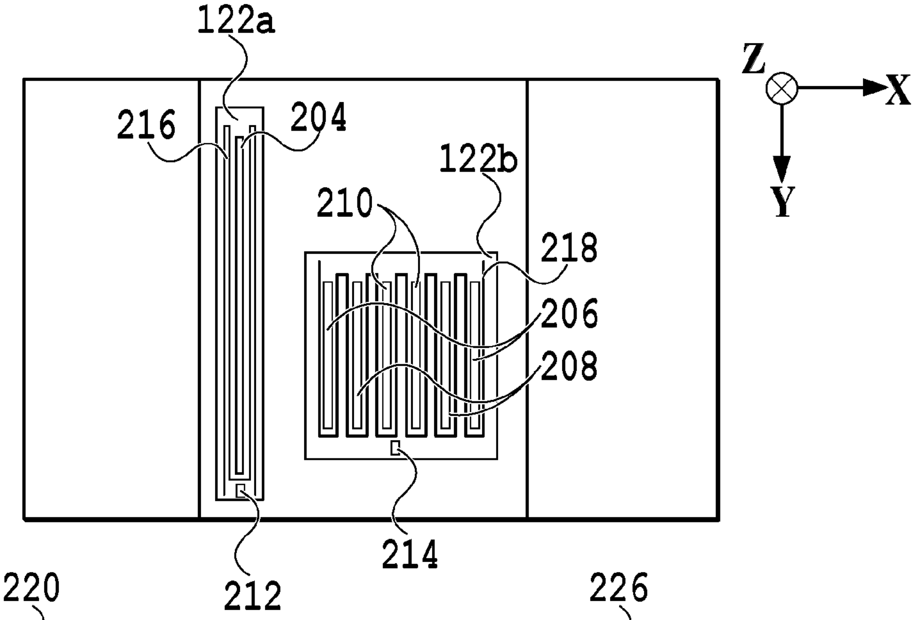
Figure 2C:
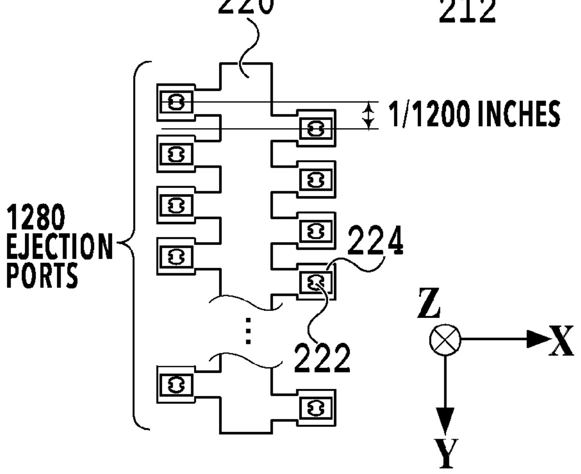
Figure 2D:
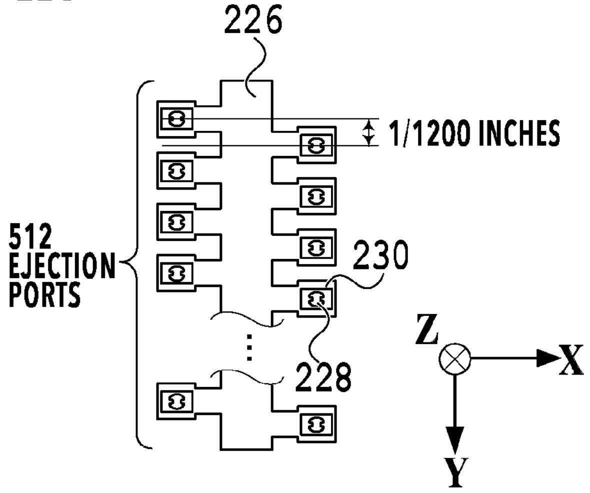

Here, with reference to FIG. 2A to FIG. 2D, the configuration of the print head 116 will be explained. FIG. 2A is a perspective configuration diagram of the print head 116. FIG. 2B is a diagram of the chip plane of the print head 116 on which the print chips 122 are installed. FIG. 2C is a diagram illustrating the nozzle array in the print chip 122*a*. FIG. 2D is a diagram illustrating the respective nozzle arrays in the print chip 122*b*.

The print head 116 receives a print signal from the main body of the printing apparatus 100 via the contact pad 202 and is supplied with power necessary for driving the print head 116.

The print chip 122*a* is formed with the nozzle array 204 in which an array of multiple nozzles for ejecting Bk ink is arranged in the Y direction. The print chip 122*b* is formed with the nozzle array 206 in which an array of multiple nozzles for ejecting C ink is arranged in the Y direction. Further, the print chip 122*b* is formed with the nozzle array 208 in which an array of multiple nozzles for ejecting M ink is arranged in the Y direction. Furthermore, the print chip 122*b* is formed with the nozzle array 210 in which an array of multiple nozzles for ejecting Y ink is arranged in the Y direction.

The print chip 122*a* is equipped with the diode sensor (Di sensor) 212, which detects the temperature of the print head 116, on one end side of the nozzle array 204 in the Y direction. Further, the print chip 122*b* is equipped with the Di sensor 214, which detects the temperature of the print head 116, on one end side of the nozzle array 210 in the Y direction. The Di sensors 212 and 214 are located on the print chips 122*a* and 122*b* on the downstream side in the conveyance direction of the print medium S.

The print chips 122*a* and 122*b* are respectively equipped with the sub-heaters 216 and 218 for heating ink. Each of the sub-heaters 216 and 218 applies heat or does not apply heat to the printhead substrate, depending on whether or not a voltage is applied.

In the nozzle array 204 of the print chip 122*a*, as illustrated in FIG. 2C, the ejection ports 222 that eject ink are formed on both sides of the liquid chamber 220 which extends in the Y direction. The heaters 224 for ink ejection are arranged at positions corresponding to the respective ejection ports 222, i.e., directly below the respective ejection ports 222 (the +Z direction side) in the present embodiment. In the nozzle array 204, 1280 ejection ports 222 are formed. Further, in the respective nozzle arrays 206, 208, and 210 of the print chip 122*b*, as illustrated in FIG. 2D, the ejection ports 228 that eject ink are formed on both sides of the liquid chamber 226 which extends in the Y direction. The heaters 230 for ink ejection are arranged at positions corresponding to the respective ejection ports 228, i.e., directly below the respective ejection ports 228 in the present embodiment. In the nozzle arrays 206, 208, and 210, 512 ejection ports 228 are formed.

The heaters 224 and 230 respectively generate heat in response to an application of a voltage and generate bubbles in the ink in the liquid chambers 220 and 226, in order to eject the ink from the corresponding nozzles. Further, in the nozzle arrays 204, 206, 208, and 210, serial numbers, such as 0, 1, 2, . . . , are assigned in order in the −Y direction from the side where the Di sensors 212 and 214 are located. The interval between the ejection ports 222 in the nozzle array 204 and the interval between the ejection ports 228 in the nozzle arrays 206, 208, and 210 are 1/1200 inches, respectively. Therefore, in the nozzle arrays 204, 206, 208, and 210, nozzles which are configurations for ejecting ink from the ejection ports 222 and 228 are formed with the ejection ports 222 and 228 and the heaters 224 and 230.

Figure 3:
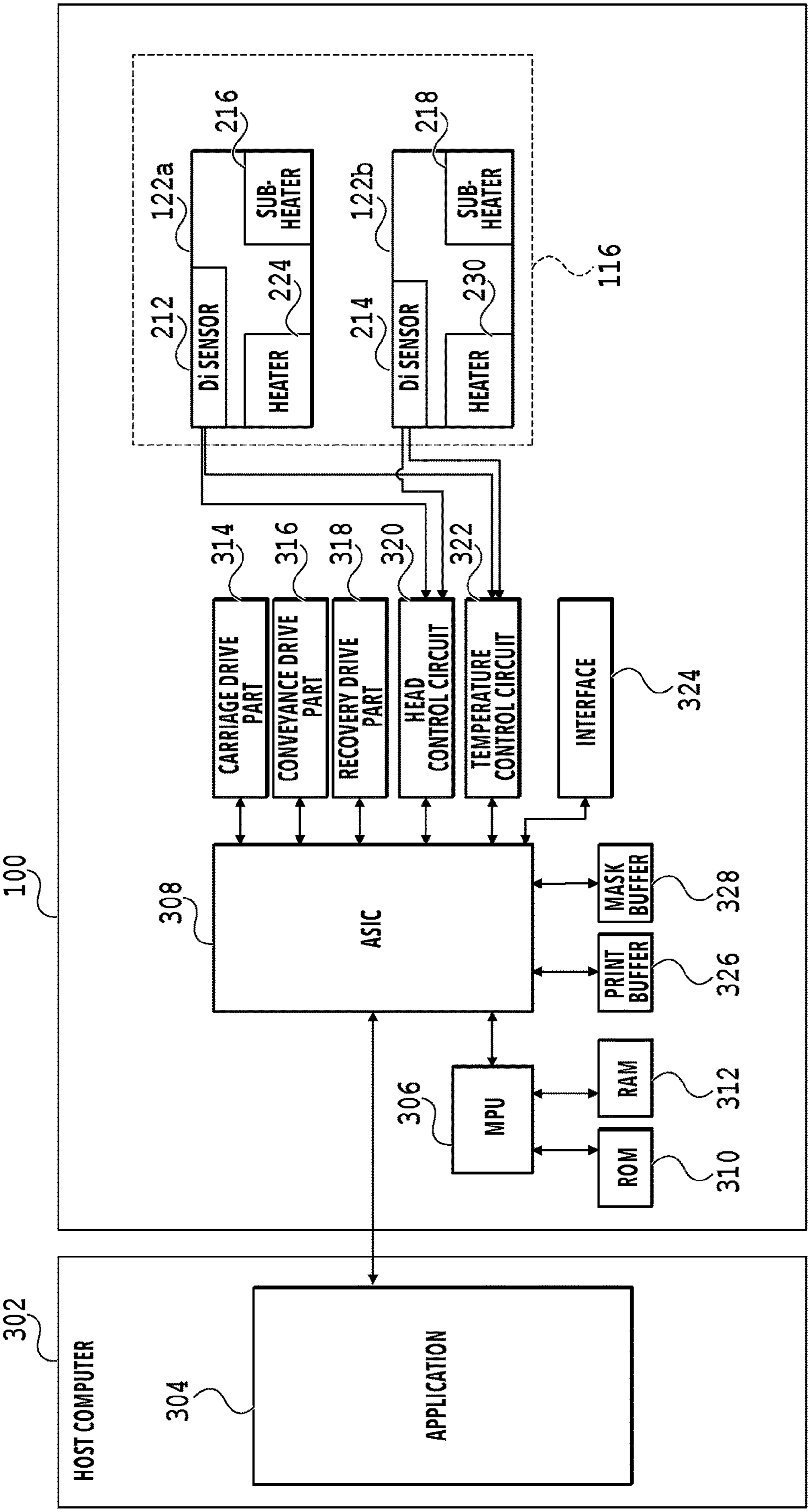
FIG. 3 is a block configuration diagram of a printing control system of the printing apparatus.

Next, the configuration of a printing control system of the printing apparatus 100 will be explained. FIG. 3 is a block diagram illustrating the configuration of the printing control system of the printing apparatus 100. The printing apparatus 100 is connected to the host computer 302. The host computer 302 sends multivalued image data of a bitmap format in which each pixel has a value of three RGB channels (for example, 0 to 255), which is saved in various kinds of storage media (not illustrated in the drawings) such as a hard disk or a memory, to the printing apparatus 100. Note that, in the present embodiment, the host computer 302 sends the multivalued image data to the printing apparatus 100 by use of the application 304. For example, it is also possible that the host computer 302 outputs multivalued image data that is input from an external apparatus, such as a scanner or a digital camera, to the printing apparatus 100 after processing the multivalued image data with the application 304.

The printing apparatus 100 performs image processing on image data that is input from the host computer 302 by use of the MPU 306, ASIC 308, etc. Specifically, on input multivalued image data, binarization processing or a masking process is performed by the MPU 306, the ASIC 308, or the like. Accordingly, the printing apparatus 100 generates print data of a binary bitmap format, which indicates ejection or non-ejection of ink from the print head 116 for each pixel.

Further, the printing apparatus 100 prints an image by ejecting ink from the print head 116 to the print medium S, based on the generated print data. The printing apparatus 100 is controlled by the MPU 306 according to programs stored in the ROM 310. The RAM 312 functions as a work area or a temporary data saving area of the MPU 306.

Via the ASIC 308, the MPU 306 controls the carriage drive part 314 for driving the carriage 118 and the conveyance drive part 316 for driving the conveyance roller 106 and the discharge roller 112 in the conveyance part 102. Further, via the ASIC 308, the MPU 306 controls the recovery drive part 318 that controls the configuration for performing the recovery processing on the print head 116. Furthermore, via the ASIC 308, the MPU 306 controls the head control circuit 320 for driving the print head 116, the temperature control circuit 322 for controlling the temperature of the print head 116, and the interface 324.

The configuration for performing the recovery processing is a configuration for maintaining and recovering the ejection state of ink from the ejection ports 222 and 228 in a good manner. Specifically, publicly-known configurations, such as a cap that protects the chip plane of the print head 116 on which the print chips 122 are installed, a suction device that decompresses the inside of the cap and forcibly sucks ink from the nozzles, and a wiper that wipes (performs wiping) the chip plane, are applicable. The recovery drive part 318 is a drive part that drives these configurations, and each configuration may be equipped with a respective drive system such as a motor or may be equipped with a drive system that is also used in multiple configurations.

The generated print data is temporarily stored in the print buffer 326 which is connected to the ASIC 308. Further, the mask buffer 328 is connected to the ASIC 308. The mask buffer 328 temporarily stores multiple mask patterns to be applied when print data is transferred to the print head 116. The stored mask patterns are used when executing a print mode in which printing is performed by a multi-pass printing method, that is, a method of performing ejection associated with multiple times of scanning with the print head 116 onto a unit print area on the print medium S, and when executing division control. Note that the various kinds of mask patterns that can be stored in the mask buffer 328 are stored in the ROM 310 in advance, and, at the time of actual printing, a corresponding mask pattern is read out from the ROM 310 and stored in the mask buffer 328.

In the present embodiment, it is assumed that the printing apparatus 100 is able to perform printing on the print medium S up to A4 size (8.27 inch×11.69 inch), and the printing resolution in the X direction is 600 dpi. Further, in the present embodiment, the printing rate when two dots are arranged on a grid of 600 dpi×600 dpi is defined as 100% duty. In the case of the print head 116, since the nozzle resolution in the Y direction is 1200 dpi, the duty is 100% if one dot is arranged in a grid of 600 dpi×600 dpi by one nozzle.

The temperature control circuit 322 determines the drive conditions of the sub-heaters 216 and 218 of the print chips 122, based on the output values of the Di sensors 212 and 214 which detect the temperature of the print head 116. Then, the head control circuit 320 drives the sub-heaters 216 and 218, based on the determined drive conditions. Further, the head control circuit 320 drives the heaters 224 and 230 of the print head 116.

By driving the sub-heaters 216 and 218 and the heaters 224 and 230 with the head control circuit 320, the print head 116 performs preliminary ejection, ink ejection, and head temperature adjustment, which is for adjusting the temperature, etc. The program for executing the temperature control is stored in the ROM 310, for example. By such a program, the head control circuit 320 and the temperature control circuit 322 execute the detection of the temperature of the print head 116 and the driving of the sub-heaters 216 and 218. Further, the head control circuit 320 performs PWM driving control by driving the heaters 224 and 230 with a drive signal (driving pulse), which is composed of a pre-pulse and a main-pulse, according to the temperature of the print head 116.

Figure 4:
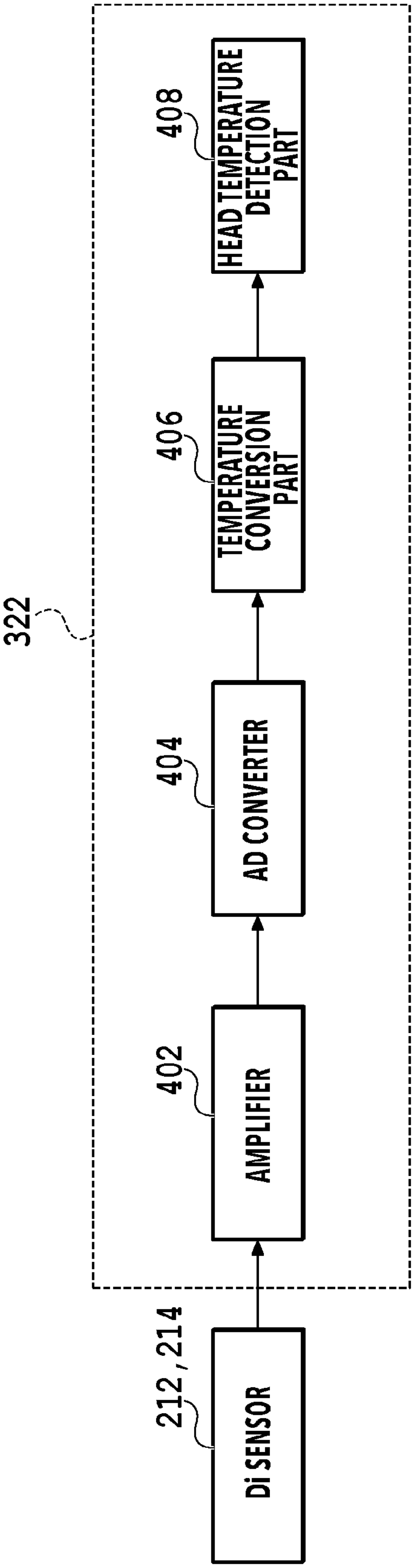
FIG. 4 is a diagram illustrating a flow of temperature detection in a temperature control circuit.

Next, the flow of temperature detection of the print head 116, which is performed with the temperature control circuit 322, will be explained. FIG. 4 is a diagram illustrating the flow of temperature detection, which is performed with the temperature control circuit 322. If voltages based on the temperature of the print head 116 are input from the Di sensors 212 and 214 of the print head 116 to the temperature control circuit 322, the amplifier 402 first amplifies the input voltage values. The voltage values amplified by the amplifier 402 are digitized by the analog-to-digital converter (AD converter) 404. The voltage values ADdi from the Di sensors 212 and 214 which are digitized by the AD converter 404 are converted into the temperature Th by the temperature conversion part 406. The temperature conversion part 406 converts the voltage values ADdi into the temperature Th by use of the ADdi-temperature conversion formula, which is stored in the ROM 310. The converted temperature Th is output to the head temperature detection part 408.

The temperature Th which is detected by the head temperature detection part 408 is output to the head control circuit 320, and, according this temperature Th, the head control circuit 320 determines the driving pulses for driving the heaters 224 and 230 to eject ink. FIG. 5 is a correspondence table between temperature of the print head 116 (print chips 122) and driving pulse, which is used for determination of driving pulses that is executed by the head control circuit 320. The head control circuit 320 first determines the driving pulse number, based on the input temperature Th, by use of the correspondence table 500 illustrated in FIG. 5. For example, this correspondence table 500 is stored in the ROM 310. Note that the head control circuit 320 is not limited to the one that uses the input temperature Th as it is, and it is also possible that the driving pulse number is determined based on a value of the temperature Th after correction.

The determined driving pulse number is appropriately stored in the RAM 312. Further, the head control circuit 320 drives the heaters 224 and 230, based on the pre-pulse and main-pulse associated with the driving pulse number. The relation between the driving pulse number and the pre-pulse and main-pulse is stored in a storage area of the ASIC 308, the ROM 310, and the RAM 312, or the like, for example. In the correspondence table 500, the driving pulse numbers are set so that a stronger driving pulse, that is, a driving pulse with which the pulse width is large or the pulse voltage is high, will be selected for a lower temperature Th.

A case in which printing is performed on a print medium by use of the above-explained printing apparatus 100 will be explained. If an instruction to start printing is input from an operation part or the like (not illustrated in the drawings) installed in the host computer 302 or the printing apparatus 100, the printing apparatus 100 starts print processing for performing printing on the print medium S. In the present embodiment, the printing apparatus 100 determines the number of passes for a unit print area on a print medium, that is, the number of passes for printing in a unit print area, based on the combination of the type of print medium S and the information related to the printing quality. Note that various publicly-known technologies can be applied to such determination of the number of passes. Note that, in the present embodiment, a unit print area is an area corresponding to the length of nozzle arrays of the print chips 122 in the array direction, where printing can be performed by the print head 116 with one scanning in the X direction.

In the following explanation, an explanation will be given of the case in which printing with 2-section division control is performed for a printing command of a one-pass image, that is, for printing in a unit print area. Note that, since similar processing is executed for the print chips **122*a* and 122*b* in the present embodiment, the processing on the print chip 122*b*** will be explained in the following explanation.

Figure 6:
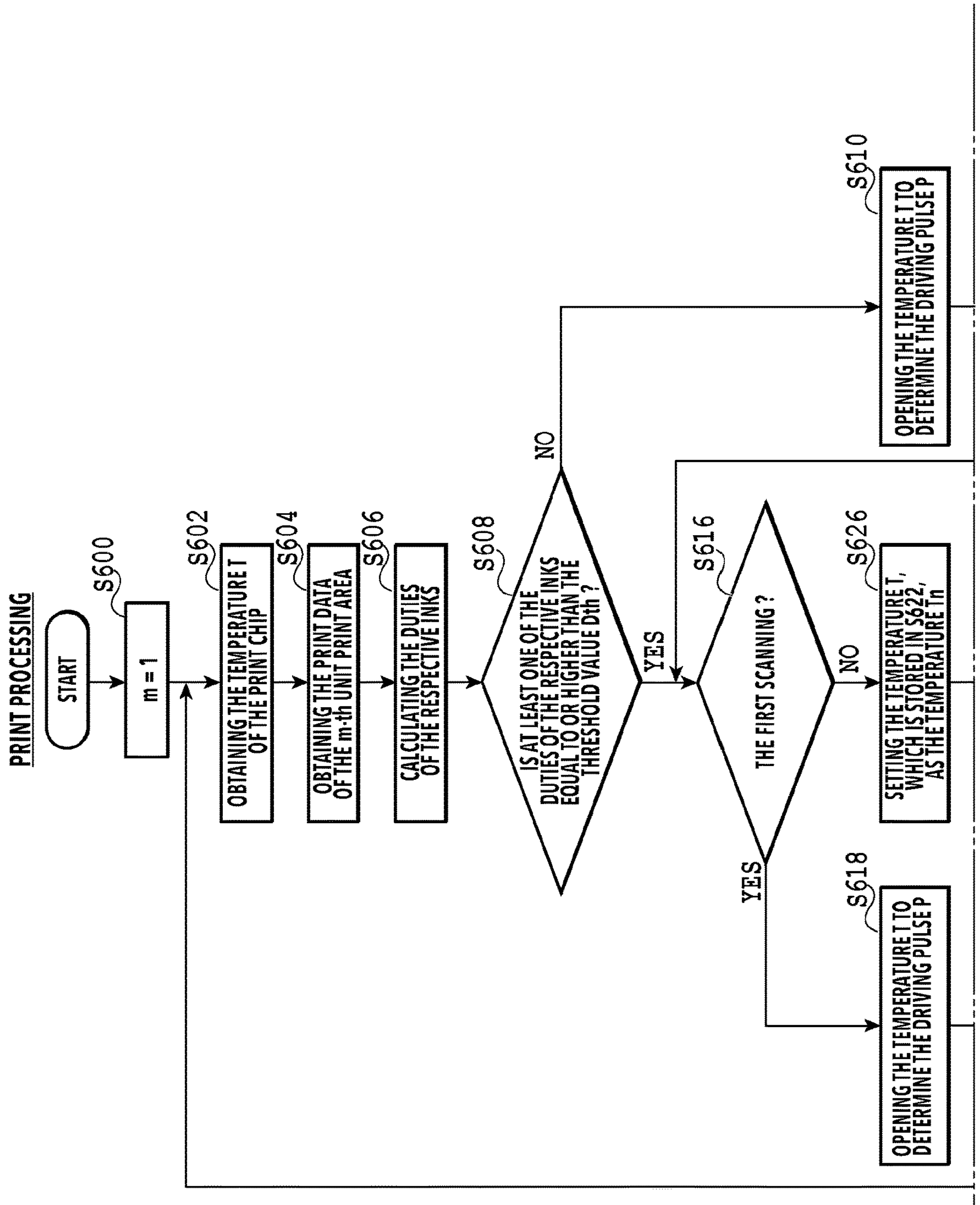
FIG. 6 is a diagram showing a relation between FIGS. 6A and 6B.
Figure 6A:
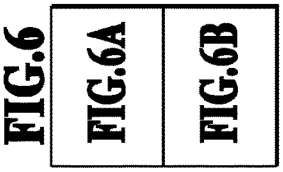
FIGS. 6A and 6B are flowcharts illustrating details of processing of print processing.
Figure 6B:
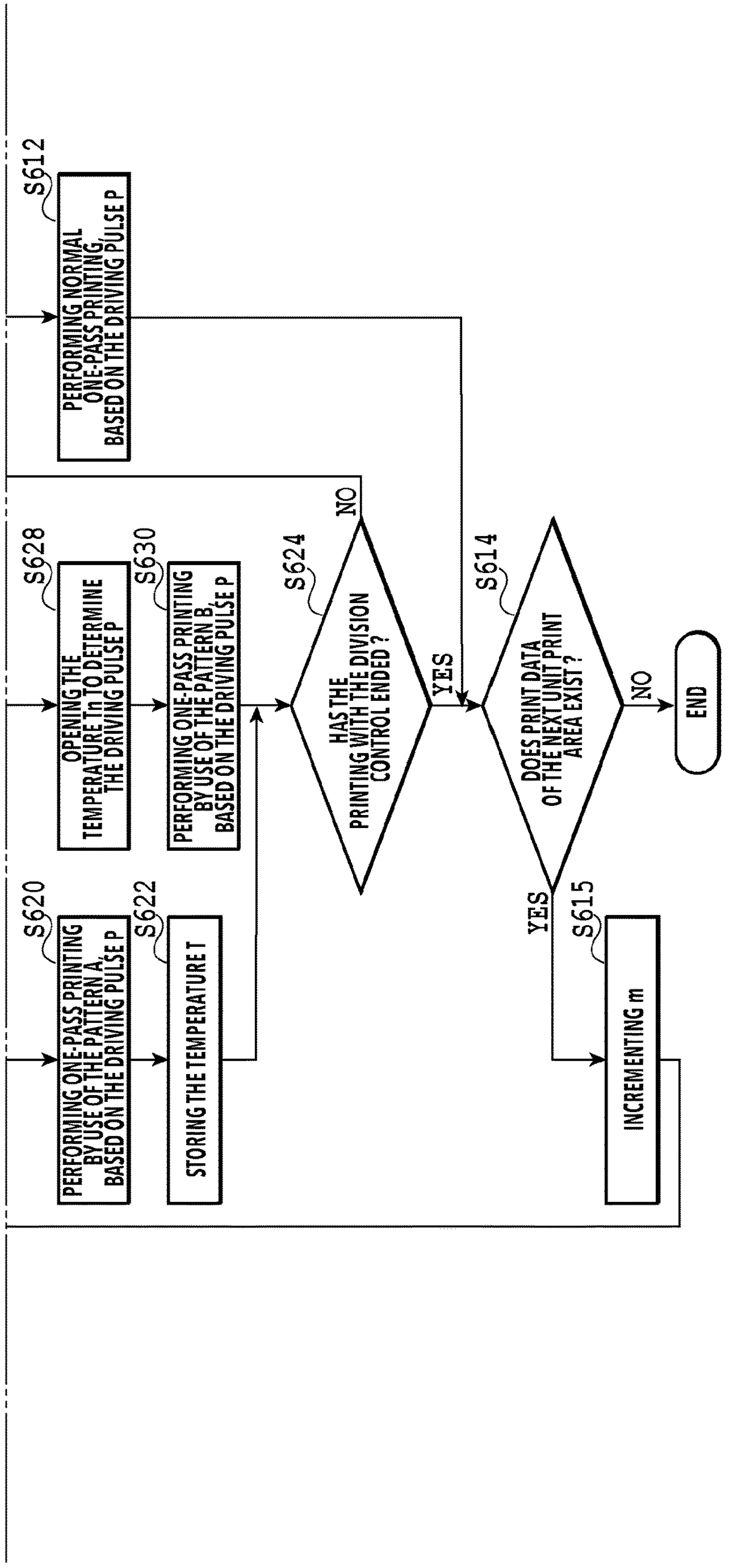

FIGS. 6A and 6B are flowcharts illustrating the details of processing of the print processing to be executed by the printing apparatus according to the present embodiment. The series of these processes illustrated in this flowchart of FIGS. 6A and 6B is performed by the MPU 306 loading a program code stored in the ROM 310 into the RAM 312 and executing the program code. Alternatively, a part or all of the functions in the steps of FIGS. 6A and 6B may be executed by hardware such as an ASIC or an electronic circuit. Note that the sign "S" in the explanation of each process means that it is a step of the flowchart.

If the print processing is started, the MPU 306 first sets the variable m, which represents the unit print area on which printing is to be performed, to 1 (S600), and the temperature control circuit 322 detects the temperature T of the print head 116, based on the detection result of the Di sensor 214 (S602). In this way, in the present embodiment, the temperature control circuit 322 functions as a detection part that detects the temperature of the print head 116. Note that it is also possible that the Di sensor 214 is included in this detection part. Then, the MPU 306 obtains the print data corresponding to the m-th unit print area (S604). Next, in the obtained print data, the MPU 306 counts the respective dot numbers of the C ink, M ink, and Y ink, as well as the image width W (the length in the X direction) and, for ink of each color, the MPU 306 calculates a value by dividing the dot number by the image width W as the duty thereof (S606). In this way, in the present embodiment, the MPU 306 functions as an obtainment part that obtains information related to the ink to be ejected to a unit print area.

Thereafter, the MPU 306 determines whether or not at least one of the calculated respective duties of the C ink, M ink, and Y ink is equal to or higher than the threshold value Dth (S608). The threshold value Dth is a value used for determination of the division control and is stored in the ROM 310 in advance. Note that, if a duty of an ink is equal to or higher than the threshold value Dth, it is determined as a high duty, in which the amount of mist generated during one-pass printing is large and thus there is a high possibility that an image defect occurs due to the mist. On the other hand, if the duties of the inks are lower than the threshold value Dth, it is determined as a duty in which there is low risk that an image defect or the like occurs.

If it is determined in S608 that not even one of the respective duties of the C ink, M ink, and Y ink is equal to or higher than the threshold value Dth, that is, if it is determined that all the duties are lower than the threshold value Dth, the head control circuit 320 determines the driving pulse P (S610). Then, based on the determined driving pulse P, one-pass printing is performed (S612) and, thereafter, whether or not print data for the next unit print area exists is determined (S614). If it is determined in S614 that print data for the next unit print area exists, the MPU 306 increments m (S615), and the processing returns to S602. Further, if it is determined in S614 that print data for the next unit print area does not exist, this print processing will be ended.

That is, if it is determined in S608 that all the duties of the respective inks are lower than the threshold value Dth, the duties of the respective inks will be determined as duties in which there is low risk that an image defect or the like occurs. Therefore, in S610 and S612, normal one-pass printing, that is, printing without division control, will be executed based on the print data obtained in S604. In S610, the head control circuit 320 obtains a driving pulse number, based on the temperature T which is obtained in S602 and the correspondence table 500. Then, the pre-pulse and main-pulse that are associated with the obtained driving pulse number will be obtained. In S612, one-pass printing is performed, based on the pre-pulse and main-pulse obtained in S610.

On the other hand, if it is determined in S608 that at least one of the respective duties of the C ink, M ink, and Y ink is equal to or higher than the threshold value Dth, the printing apparatus 100 executes printing based on the print data obtained in S604 with division control by use of masks. That is, if at least one of the duties of the respective colors of ink is equal to or higher than the threshold value Dth, it will be determined that there is a risk that an image defect occurs due to the high duty, so that the division control will be executed for suppressing such an image defect. In this way, in the present embodiment, the MPU 306 functions as a setting part that sets whether normal printing or printing with division control, that is, sets the scan count of the print head 116 associated with printing. Specifically, in the present embodiment, whether the scan count is one (the first number of times) with the normal printing or the scan count is two (the second number of times) with the division control is set.

Figure 7B:
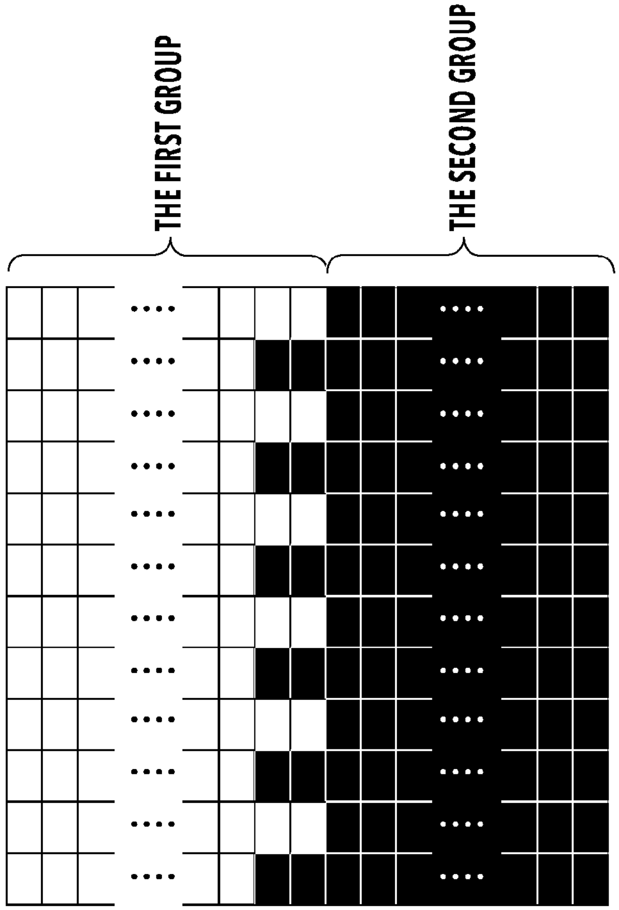
FIG. 7A and FIG. 7B are diagrams illustrating an example of mask patterns.
Figure 7A:
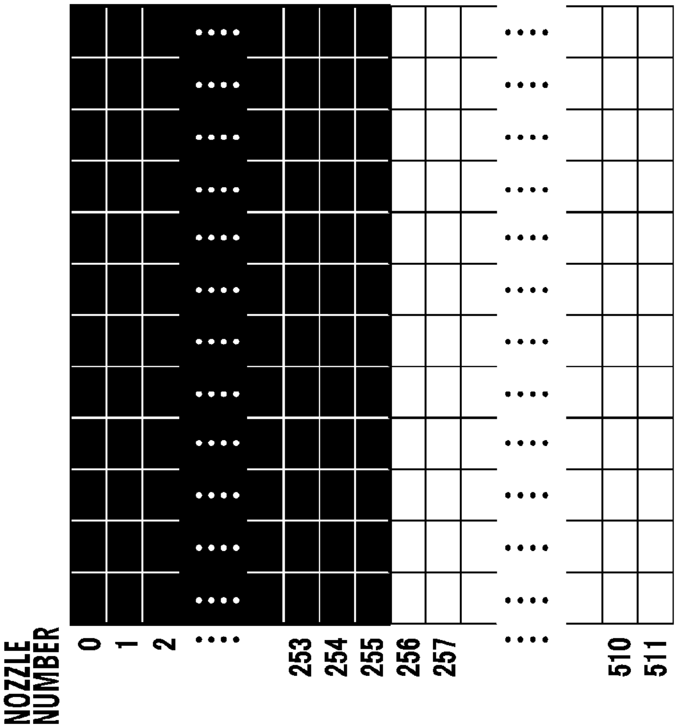

Here, the mask patterns to be used for the division control will be explained. FIG. 7A and FIG. 7B are diagrams illustrating mask patterns to be used in the present embodiment, and each mask pattern is applied to the respective print data to be printed by the nozzle arrays 206, 208, and 210. FIG. 7A is a diagram illustrating the pattern A to be used at the time of the first scanning with division control, and FIG. 7B is a diagram illustrating the pattern B to be used at the time of the second scanning with division control.

The pattern A is a pattern that uses the nozzle group on the nozzle number 0 side (the nozzles of the nozzle numbers 0 to 255), that is, the nozzle group of the first group which is close to the Di sensor 214, and does not use the nozzle group of the second group which is far from the Di sensor 214 (the nozzles of the nozzle members 256 to 511). Note that, although the first group corresponds to the nozzles of the nozzle members 0 to 255 and the second group corresponds to the nozzles of 256 to 511 in FIG. 7A and FIG. 7B, this is merely an example of nozzles of the first group and the second group. That is, the nozzles of the first group and the nozzles of the second group are not limited to the nozzles illustrated in FIG. 7A and FIG. 7B. The pattern B is a pattern that uses the nozzles of the third group, which is a part of the first group, and uses the nozzles of the second group.

Note that, although the patterns A and B each have 12 pixels in the X direction (the direction of the image width), the patterns A and B are respectively repeated for the image width in the X direction and used in the present embodiment. Further, in the specification of the present application, the "nozzles close to the Di sensor" or the "nozzles in the vicinity of the Di sensor" are indicative of nozzles at positions whose distances from the Di sensor are less than a predetermined value. Furthermore, the "nozzles far from the Di sensor" or the "nozzles distant from the Di sensor" are indicative of nozzles at positions whose distances from the Di sensor are equal to or more than the predetermined value. Therefore, as for the nozzle arrays in the patterns A and B of FIG. 7A and FIG. 7B, the multiple nozzles whose distance to the Di sensor 214 are less than a predetermined distance are illustrated as the first group, and the multiple nozzles whose distances are equal to or more than the predetermined value are illustrated as the second group.

Generally, if printing of a high duty is performed, "edge position error" which causes the ejection direction at an edge part of a nozzle array to be erroneously changed toward the inner side of the nozzle array occurs. That is, in a case where division control is performed at the time of a high duty, since the duties of the printed portions of the first scanning and the second scanning are high, there is a risk that edge position error occurs in the respective printed portions so that a white streak is generated at the boundary section, and thus the image quality is deteriorated.

Therefore, in the present embodiment, in order to suppress deterioration in the image quality due to edge position error, ink is ejected in both of the first scanning and the second scanning for the partial pixels of the partial nozzles at the boundary section of the patterns in the pattern B. In the present embodiment, two nozzles out of 512 nozzles in one nozzle array are designated as the number of partial nozzles, and a half of all the pixels are designated as the partial pixels. Specifically, in the pattern B, the nozzles of the nozzle numbers 254 and 255 in the first group eject ink on every other pixel in the X direction. Therefore, in the present embodiment, in the pattern A, ink can be ejected from the group (the first group) of the multiple nozzles whose distances to the Di sensor are less than the first predetermined value. Further, in the pattern B, ink can be ejected from the group (the second group) of the nozzles whose distances to the Di sensor are equal to or less than the first predetermined value and equal to or more than the second predetermined value. Note that the number of nozzles and pixels in the first group to be used in the pattern B are not limited as such and can be changed as appropriate, and, if a print chip that does not cause edge position error so much is used, it is also possible not to use the first group in the pattern B.

Returning to FIG. 6, the explanation is continued. If it is determined in S608 that at least one of the duties of the respective colors of ink is equal to or higher than the threshold value Dth, the MPU 306 determines whether or not it is to be the first scanning of the division control (S616). That is, in S616, whether or not the printing by the scanning to be executed from now is the scanning of the first time in the unit print area is determined. Here, in the case of the first scanning, the nozzle group to be used in the scanning is close to the Di sensor 214. On the other hand, in the case of not the first scanning, the nozzle group to be used in the scanning is far from the Di sensor 214. Further, in the case of not the first scanning, temperature distribution has occurred in the print chip 122*b* due to the scanning that was performed before the scanning, that is, the printing that was executed with the scanning associated with the previous printing.

Therefore, if it is determined to be the first scanning in S616, the head control circuit 320 uses the temperature T, which is obtained in S602, to determine the driving pulse P to be used for the printing of the first scanning (S618). That is, in a case where the nozzle group to be used for printing is close to the Di sensor 214, the difference between the average temperature of the nozzle group and the temperature T obtained in S602 is relatively small. Therefore, in S618, the driving pulse number is obtained based on the temperature T (the first temperature), which is obtained in S602, and the correspondence table 500. Further, the pre-pulse and main-pulse that are associated with the obtained driving pulse number are determined as the driving pulse P (the first driving pulse) to be used for the printing during the first scanning. In this way, in the present embodiment, the head control circuit 320 functions as a determination part that determines a driving pulse for ejecting ink from the print head 116, based on the temperature detected by the Di sensor.

Next, based on the driving pulse P which is determined in S618, the head control circuit 320 prints an image in which the pattern A is applied to the image in the unit print area (one-path image) (S620), and the MPU 306 stores the temperature T which is obtained in S602 in the RAM 312 (S622). Thereafter, the MPU 306 determines whether or not the printing with the division control in the unit print area has ended (S624). That is, in S624, whether or not the most recent printing was the printing in the second scanning with the division control. In the case of being the printing in the first scanning, it is determined that the printing with the division control in the unit print area has not ended, and, in the case of being the printing in the second scanning, it is determined that the printing with the division control in the unit print area has ended.

If it is determined in S624 that the printing with the division control in the unit print area has ended, the processing proceeds to S614. Further, if it is determined in S624 that the printing with the division control in the unit print area has not ended, the processing returns to S616.

On the other hand, if it is determined to be the second scanning in S616, the head control circuit 320 sets the temperature T, which was used for the first scanning and stored in RAM 312 in S622, as the temperature Tn to be used for determining the driving pulse P (S626). Here, in the second scanning, temperature distribution has occurred in the print chip 122*b* due to the printing during the first scanning. Since the nozzle group used in the first scanning is close to the Di sensor 214, there is a high possibility that the temperature that is detected by the Di sensor 214 immediately before the second scanning deviates from the average temperature of the nozzle group to be used in the second scanning. According to experiments by the inventors of the present application, it is known that the average temperature of the nozzle group to be used for the second scanning is closer to the temperature detected by the Di sensor 214 immediately before the first scanning than to the temperature detected by the Di sensor 214 after the printing by the first scanning and immediately before the second scanning.

Therefore, in S626, the temperature T which is used in the printing by the first scanning (the first printing) is used as the temperature Tn which is used for determining the driving pulse P in the printing by the second scanning (the second printing). If the temperature Tn (the second temperature) for determining the driving pulse P is set in S626, the head control circuit 320 subsequently determines the driving pulse P for the second scanning by use of the set temperature Tn (S628). That is, in S628, the driving pulse number is obtained based on the temperature Tn, which is set in S626, and the correspondence table 500. Further, the pre-pulse and the main-pulse that are associated with the obtained driving pulse number are determined as the driving pulse P (the second driving pulse) to be used for printing during the second scanning. Thereafter, based on the driving pulse P which is determined in S628, the MPU 306 prints the image in which the pattern B is applied to a one-pass image (S630), and the processing proceeds to S624.

Figures 8A, 8B:
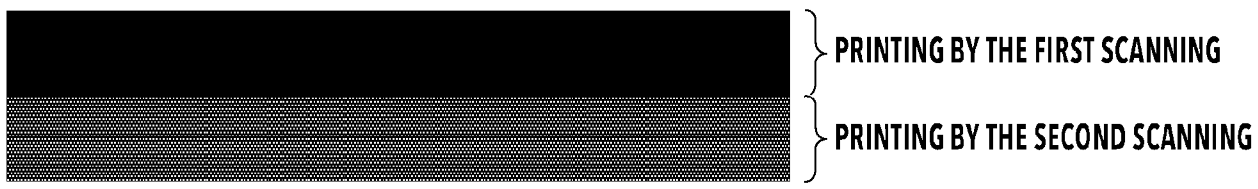
FIG. 8A to FIG. 8D are diagrams illustrating the verification results of a verification experiment.
Figures 8C, 8D:

Here, the result of a verification experiment for verifying the functional effect of the present embodiment will be explained. FIG. 8A to FIG. 8D are diagrams illustrating the verification result of the verification experiment of the present embodiment. FIG. 8A and FIG. 8B are diagrams illustrating the verification result of a comparative example to which the technology according to the present embodiment is not applied, and FIG. 8C and FIG. 8D are diagrams illustrating the verification result of an exemplary embodiment to which the technology according to the present embodiment is applied.

In this verification experiment, the same print head 116 was used in both comparative example and exemplary embodiment, and an image whose duty is uniformly high across the printing width was used as the printed image. Further, the printing of the printed image was performed by 2-section division control. An image to which the pattern A was applied was printed in the first scanning, and an image to which the pattern B was applied was printed in the second scanning. In the comparative example, regarding the first scanning, the driving pulse was obtained by use of the temperature detected by the Di sensor at the time of performing the first scanning, and, regarding the second scanning, the driving pulse was obtained by use of the temperature detected by the Di sensor at the time of performing the second scanning. In the exemplary embodiment, regarding the first scanning, the driving pulse was obtained by use of the temperature detected by the Di sensor at the time of performing the first scanning, and, regarding the second scanning, the driving pulse was obtained by use of the temperature detected by the Di sensor at the time of performing the first scanning. Note that the timing for detecting the temperature by the Di sensor is before (immediately before) scanning associated with printing is actually performed by the print head 116.

As illustrated in FIG. 8A and FIG. 8C, in both the comparative example and the exemplary embodiment, the temperature T detected by the Di sensor at the time of performing the second scanning has the value that is higher by 10° C. than the average temperature of the nozzle group to be used for the second scanning due to the influence of the printing in the first scanning. In the comparative example, since the driving pulse P is set by use of the detected temperature T, the driving pulse that is weak for the average temperature of the nozzle group to be used is set (see FIG. 8A). Accordingly, the printing during the second scanning becomes thinner than the printing during the first scanning, and thus unevenness occurs (see FIG. 8B). On the other hand, in the exemplary embodiment, since the driving pulse P is set by use of the temperature detected by the Di sensor at the time of performing the first scanning, instead of the above-mentioned detected temperature T, it is possible to set the appropriate driving pulse P for the average temperature of the nozzle group to be used (see FIG. 8C). Accordingly, the printing during the first scanning and the printing during the second scanning are performed at the same density, and thus no unevenness occurs (see FIG. 8D).

As explained above, the printing apparatus 100 performs the 2-section division control, in which, after the first printing using the nozzles close to the Di sensor in the nozzle arrays is performed for a unit print area, the second printing using the nozzles far from the Di sensor in the nozzle arrays is performed. Further, the first driving pulse to be used for the first printing is determined by use of the temperature detected by the Di sensor, and the second driving pulse to be used for the second printing is determined by utilizing the temperature that was used for determining the first driving pulse. Accordingly, when determining the second driving pulse to be used for the second printing, the printing apparatus 100 can determine an appropriate driving pulse without an influence of the temperature distribution caused by the first printing which is the printing immediately before the second printing.

Second Embodiment

Next, with reference to FIG. 9A through FIG. 10D, an explanation will be given of a printing apparatus according to the second embodiment. Note that, in the following explanation, the same or corresponding configurations as those of the printing apparatus according to the first embodiment described above are assigned with the same signs as those used in the first embodiment, so as to omit detailed explanations thereof.

In the above-described first embodiment, when printing with the 2-section division control is performed, the driving pulse for printing by the second scanning is determined by use of the temperature that was used for determining the driving pulse for printing by the first scanning. On the other hand, in the second embodiment, at the time of performing printing by use of the nozzles that are distant from the Di sensor after performing printing by use of the nozzles in the vicinity of the Di sensor, the driving pulse is determined by use of a value obtained by correcting the temperature detected by the Di sensor.

Figure 9A:
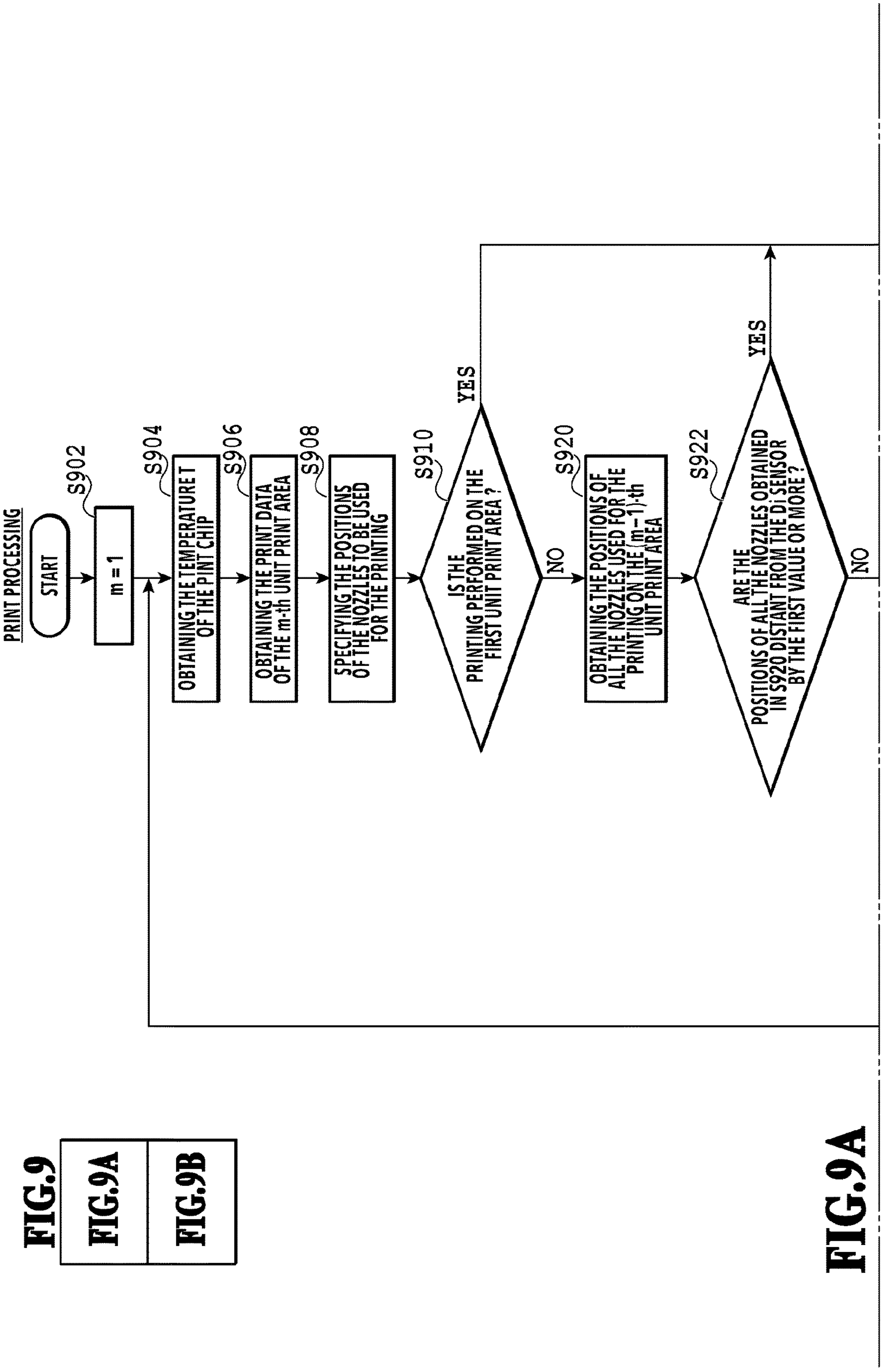
FIGS. 9A and 9B are flowcharts illustrating details of processing of print processing.
Figure 9B:
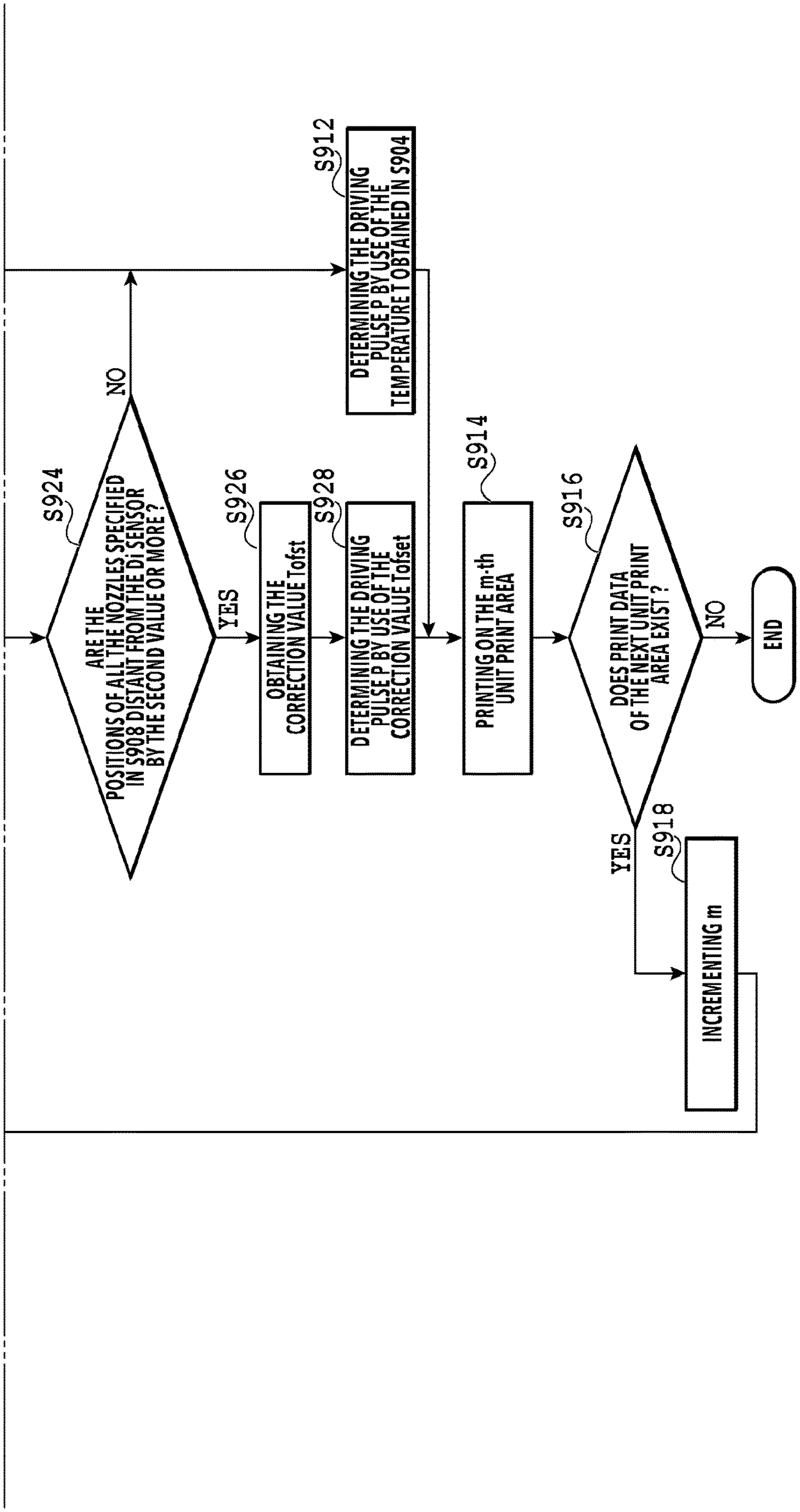

Since similar processing is executed for the print chips 122*a* and 122*b* in the print processing of the present embodiment as well, the processing to be executed on the print chip 122*b* will be explained in the following explanation. Further, in the print processing of the present embodiment, printing is performed on a unit print area in one pass, regardless of the duty. FIGS. 9A and 9B are flowcharts illustrating the details of processing of the print processing to be executed by the printing apparatus according to the second embodiment. The series of these processes illustrated in the flowchart of FIGS. 9A and 9B is performed by the MPU 306 loading a program code stored in the ROM 310 into the RAM 312 and executing the program code. Alternatively, a part or all of the functions in the steps of FIGS. 9A and 9B may be executed by hardware such as an ASIC or an electronic circuit.

If the print processing is started, the MPU 306 first sets the variable m, which is indicative of the unit print area on which printing is to be performed, to 1 (S902), and the temperature control circuit 322 detects the temperature T of the print chip 122*b* with the Di sensor 214 (S904). Then, the MPU 306 obtains the print data corresponding to the m-th unit print area (S906). Note that the specific details of processing of S902 to S906 are the same as those of S600 to 604 described above.

Next, the MPU 306 specifies the positions of the nozzles to be used for printing, based on the print data obtained in S906 (S908). In S908, the specified positions of the nozzles are stored in the RAM 312. Then, the MPU 306 determines whether or not the printing based on the print data obtained in S906 is the printing for the first unit print area (S910). That is, in S910, whether or not m is equal to 1 is determined.

If it is determined in S910 that m is equal to 1, that is, if it is determined that the printing based on the print data obtained in S906 is the printing for the first unit print area, the head control circuit 320 determines the driving pulse P by use of the temperature T which is detected in S904 (S912). Since the specific details of processing of S912 are the same as those of S610 described above, the detailed explanations thereof will be omitted. That is, in the case of printing for the first unit print area, it is considered that almost no temperature distribution has been occurring in the print chip 122*b*. Therefore, it is considered that the average temperature of the nozzle group to be used for printing on the first unit print area is almost the same as the temperature T detected by the Di sensor 214, regardless of the distance from the Di sensor 214. Therefore, in S912, the temperature T detected in S904 is used as it is.

Thereafter, based on the determined driving pulse P, the MPU 306 performs printing on the m-th unit print area by one-pass printing (S914) and determines whether or not print data for the next unit print area exists (S916). If it is determined in S916 that print data for the next unit print area exists, the MPU 306 increments m (S918), and the processing returns to S904. Further, if it is determined in S916 that print data for the next unit print area does not exist, this print processing will be ended.

On the other hand, if it is determined in S910 that m is not equal to 1, that is, if it is determined that the printing based on the print data obtained in S906 is not the printing for the first unit print area, the positions of all the nozzles used for the printing on the (m−1)-th unit print area is obtained (S920). That is, if it is determined in S910 that the printing is not for the first unit print area, it is considered that temperature distribution has occurred in the print chip 122*b* due to the previously-performed printing on a unit print area. That is, there is a possibility that a difference has occurred between the temperature T, which is detected in S904, and the average temperature of the nozzle group to be used for printing in the m-th unit print area.

Therefore, first, in S920, the MPU 306 obtains the positions of all the nozzles used for printing on the (m−1)-th unit print area, which are stored in the RAM 312. Next, the MPU 306 determines whether or not the positions of all the nozzles obtained in S920 are distant from the Di sensor 214 by the first value or more (S922). In S922, the distances to the Di sensor 214 are obtained for all the nozzles obtained in S920, and whether or not the obtained distances are equal to or more than the preset first value is determined.

Note that it is also possible that, for example, the position of the Di sensor 214 and the position of each nozzle are defined in the print chip 122*b* by coordinate values or the like, so that the distance from the Di sensor of each nozzle is calculated based on the information related to the defined positions. Alternatively, it is also possible to store the distance from the Di sensor 214 of each nozzle. In this case, the nozzles are specified based on the nozzle numbers or the like in S908, and whether or not all the nozzles are distant from the Di sensor by the first value or more is determined in S922. Further, the distance from the Di sensor of each nozzle is, for example, the distance to the Di sensor in the Y direction of each nozzle. Alternatively, the linear distance to the Di sensor of each nozzle is also possible.

For example, for each nozzle array, the first value is set to ½ of the distance to the nozzle at the farthest position from the Di sensor 214 or a value in the vicinity thereof. The first value is not limited to the above-described values and is appropriately changed according to various conditions such as the configuration of the print chips 122. Specifically, it is also possible that, for example, the first value corresponds to the distance from the Di sensor 214 to the boundary position between the first group and the second group of the first embodiment (see FIG. 7A).

If it is determined in S922 that the positions of all the nozzles obtained in S920 are distant from the Di sensor 214 by the first value or more, the processing proceeds to S912 so that the subsequent processing will be executed. That is, in a case where the positions of all the nozzles obtained in S920 are distant from the Di sensor 214 by the first value or more, it is considered that the used nozzles exist across the entire nozzle array. Therefore, it is considered that the temperature distribution in the print chip 122*b* when performing printing on the m-th unit print area is relatively small. Thus, it is determined that the difference between the average temperature of the nozzle group to be used for printing on the m-th unit print area and the temperature detected by the Di sensor 214 at the time of performing printing on the unit print area is also relatively small, so that the processing proceeds to S912.

On the other hand, if it is determined in S922 that the positions of all the nozzles obtained in S920 are not distant from the Di sensor 214 by the first value or more, whether or not the positions of all the nozzles specified in S908 are distant from the Di sensor 214 by the second value or more is determined (S924). In a case where the distances to the Di sensor 214 of all the nozzle positions obtained in S920 (used in the (m−1)-th unit print area) are less than the first value, there is a possibility that significant temperature distribution has occurred to the print chip 122*b*. Therefore, in S924, the MPU 306 determines whether or not the positions of all the nozzles specified in S908, that is, the positions of the nozzles to be used for the m-th unit print area, are distant from the Di sensor 214 by the second value or more.

The second value may be the same as the first value or may be a value closer to the Di sensor 214 than the first value by several nozzles, for example. Specifically, for example, it is also possible that the second value corresponds to the distance from the boundary position between the first group and the second group to the nozzle located two nozzles away toward the Di sensor 214 side (see FIG. 7B).

If it is determined in S924 that the positions of all the nozzles specified in S908 are not distant from the Di sensor 214 by the second value or more, the processing proceeds to S912 and the subsequent processing will be executed. That is, in a case where the distances to the Di sensor 214 of all the nozzle positions specified in S908 are less than the second value, the nozzle group in the vicinity of the Di sensor 214 will be used for printing in the m-th unit print area. Thus, even though temperature distribution has occurred to the print chip 122*b*, it is determined that the difference between the average temperature of the nozzle group to be used for printing on the m-th unit print area and the temperature detected by the Di sensor 214 at the time of performing printing on the unit print area is also relatively small, so that the processing proceeds to S912.

On the other hand, if it is determined in S924 that the positions of all the nozzles specified in S908 are distant from the Di sensor 214 by the second value or more, the MPU 306 obtains the correction value Tofst (S926). In a case where the positions of all the nozzles specified in S908 are distant from the Di sensor 214 by the second value or more, it is considered that the difference between the average temperature of the nozzle group to be used and the temperature detected by the Di sensor 214 are relatively large due to the temperature distribution that occurred in the print chip 122*b*. That is, it is considered that the difference between the average temperature of the nozzle group to be used for printing on the m-th unit print area and the temperature detected by the Di sensor 214 at the time of performing printing on the m-th unit print area becomes relatively large. Therefore, in S926, the correction value Tofst is obtained as the difference between the average temperature of the nozzle group to be used for printing on the m-th unit print area and the temperature T detected in S904.

The correction value Tofst is stored in the ROM 310 or the RAM 312. As the correction value Tofst, a value on the assumption of temperature distribution in the print chip 122*b* is set. Specifically, the correction value Tofst is a value that is found from an experiment, based on the relation of the heat capacities, thermal conductivities, and temperatures T of the print chip 122*b*, a member of the print head 116 at the position where the print chip 122*b* is attached, etc. The correction value Tofst is a value which corresponds to the temperature distribution and is indicative of the difference between the average temperature of the nozzle group that is distant from the Di sensor 214 and the temperature detected by the Di sensor 214 after performing printing with a nozzle group in the vicinity of the Di sensor 214. For example, in a case where the nozzle group is divided into the first group and the second group, the correction value Tofst is a value which corresponds to the assumed temperature distribution and is indicative of the difference between the average temperature of the nozzle group of the second group and the temperature detected by the Di sensor 214.

If the correction value Tofst is obtained in S926, the driving pulse P at the time of printing on the m-th unit print area is subsequently determined by use of the obtained correction value Tofst (S928), and the processing proceeds to S914 to perform printing on the m-th unit print area, based on the determined driving pulse P. That is, in S928, first, the correction value Tofst and the temperature T which is detected in S904 are added to obtain the temperature Tnew, and the driving pulse number is obtained based on this temperature Tnew and the correspondence table 500. Further, the pre-pulse and main-pulse associated with the obtained driving pulse number are determined as the driving pulse P to be used at the time of printing on the m-th unit print area.

Figures 10A, 10B:
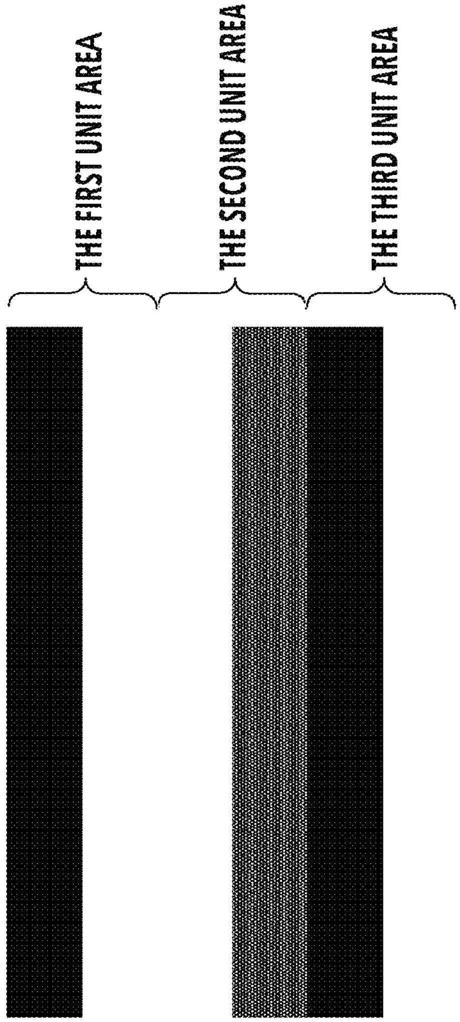
FIG. 10A to FIG. 10D are diagrams illustrating the verification results of a verification experiment.
Figures 10C, 10D:
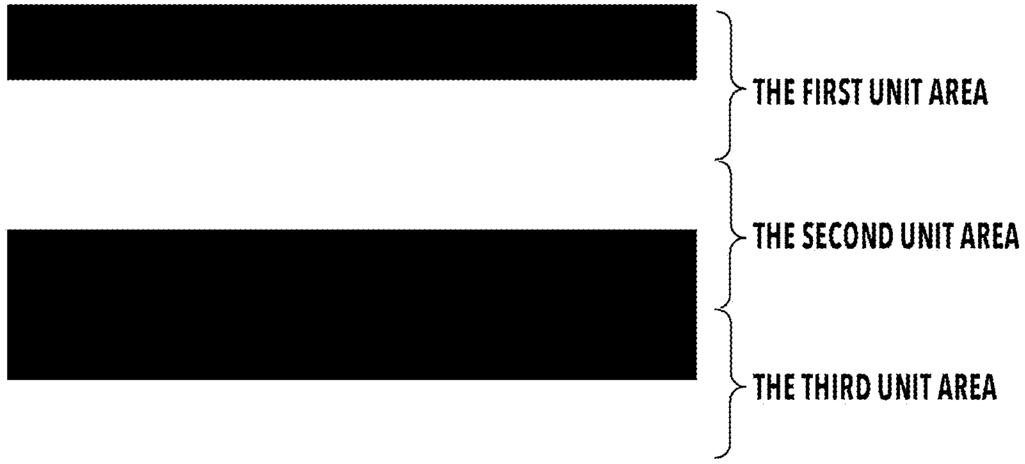

Here, the result of a verification experiment which was performed by the inventors of the present application for verifying the functional effect of the present embodiment will be explained. FIG. 10A to FIG. 10D are diagrams illustrating the verification result of the verification experiment of the present embodiment. FIG. 10A and FIG. 10B are diagrams illustrating the verification result of a comparative example to which the technology according to the present embodiment is not applied, and FIG. 10C and FIG. 10D are diagrams illustrating the verification result of an exemplary embodiment to which the technology according to the present embodiment is applied.

In this verification experiment, the same print head 116 was used in both comparative example and exemplary embodiment. Further, a high-duty image is printed on the first unit print area in one pass by use of a nozzle group whose distance from the Di sensor 214 is less than the first value. Thereafter, the print medium S is conveyed by the amount corresponding to the length of the unit print area in the Y direction, so that a high-duty image is printed on the second unit print area in one pass by use of a nozzle group whose distance from the Di sensor 214 is equal to or more than the second value. Then, the print medium S is conveyed by the amount corresponding to the length of the unit print area in the Y direction, so that a high-duty image is printed on the third unit print area in one pass by use of a nozzle group whose distance from the Di sensor 214 is less than the first value. If the printing apparatus 100 finishes printing on a predetermined unit print area, the print medium S is conveyed in the Y direction by the amount corresponding to the length of the nozzle array in the Y direction.

As illustrated in FIG. 10A and FIG. 10C, in both the comparative example and the exemplary embodiment, the temperature T of the Di sensor 214 at the time of performing printing on the second unit print area is affected by the printing on the first unit print area. Accordingly, the temperature T indicates a value that is higher than the average temperature of the nozzle group to be used for printing on the second unit print area by 10° C. The temperature T detected by the Di sensor 214 at the time of performing printing in the first and third unit print areas is approximately the same as the average temperature of the nozzle group to be used for printing. Therefore, in the printing on the first and third unit print areas, an appropriate driving pulse can be selected by use of the temperature T detected by the Di sensor 214.

On the other hand, as for the printing on the second unit print area, in the case of the comparative example, since the driving pulse P is set according to the temperature T detected by the Di sensor 214, the driving pulse P that is weak for the average temperature of the nozzle group to be used for printing is selected (see FIG. 10A). Therefore, as illustrated in FIG. 10B, the printing result in the second unit print area has a lower density than the printing result in the adjacent third unit print area, and thus unevenness occurs. On the other hand, in the case of the exemplary embodiment, the temperature for determining the driving pulse P to be used for printing on the second unit print area is set to the temperature obtained by adding the temperature T of the Di sensor 214 and the correction value Tofst. Therefore, the appropriate driving pulse P can be selected for the average temperature of the nozzle group to be used for printing (see FIG. 10C). Accordingly, as illustrated in FIG. 10D, the printing result in the second unit print area and the printing result in the adjacent third unit print area have the same density, and thus unevenness does not occur.

As explained above, in the printing apparatus 100 according to the present embodiment, at the time of preforming printing on a unit print area in one pass, the position of the first nozzle to be used in the unit print area and the position of the second nozzle used in the previous unit printing area are obtained. Further, the correction value Tofst is obtained when the distance between the position of the second nozzle and the Di sensor is less than the first value and the distance between the position of the first nozzle and the Di sensor is equal to or more than the second value. Thereafter, the driving pulse is determined by use of the temperature obtained by adding the correction value Tofst and the temperature T detected by the Di sensor, so that the printing is performed based on the determined driving pulse.

Accordingly, at the time of performing printing on a predetermined unit print area, the driving pulse for the nozzle group that is not affected much by the temperature distribution due to the printing on the previous unit print area can be determined by utilizing the temperature T that is corrected with the correction value Tofst. Therefore, in the printing apparatus 100, the driving pulse can be appropriately determined even though the nozzles to be used for printing are distant from the Di sensor.

As explained above, after the first printing using nozzles close to the sensor in a nozzle array is performed for a given unit print area, when the second printing using nozzles far from the sensor in the nozzle array is performed for the next unit print area, the printing apparatus 100 performs the following processing. The second driving pulse to be used for the second printing is determined by use of the temperature (the second temperature) obtained by correcting the temperature detected by the Di sensor with the correction value Tofst. Note that the first driving pulse used for the first printing is determined by use of the temperature (the first temperature) detected by the Di sensor. Accordingly, at the time of determining the second driving pulse to be used for the second printing, which is executed after the first printing, the printing apparatus 100 can determine an appropriate driving pulse without an influence of the temperature distribution caused by the first printing.

Other Embodiments

Note that the above-described embodiments may be modified as shown in the following (1) through (8).

(1) In the above-described first embodiment, although whether or not to perform printing with division control is determined based on the duties of the respective colors of ink in the print processing, the requirement of the determination is not limited to the duties. That is, it is also possible that whether or not to perform printing with division control is determined based on the dot numbers of the respective colors of ink, which are counted in S606. In this case, if it is determined that the dot number of each color of ink is equal to or higher than the dot number that is set as the threshold value, it is determined that the printing with the division control will be performed. The threshold value may be different for each nozzle array.

(2) In the above-described first embodiment, although it is determined that the printing with division control will be performed if at least one of the duties of the respective colors of ink exceeds the threshold value Dth in S608 of the print processing, there is not a limitation as such. For example, it is also possible to add the duties or dot numbers of the respective colors of ink, so that, if the value is equal to or higher than a threshold value that is set, it is determined that the printing with division control will be performed, and, if the value is lower than the threshold value, it is determined that the printing will be performed without division control. Accordingly, it is possible to suppress the power consumption of the print head 116 associated with the printing.

(3) In the above-described first embodiment, although the target of counting the dot number of each color of ink is an entire unit print area, there is not a limitation as such. For example, each area obtained by dividing a unit print area into predetermined numbers of pixels in the width direction of the image may be the target. Accordingly, it is possible to suppress the power consumption of the print head 116 in a time range that is shorter than the time period required for one scanning.

(4) In the above-described first embodiment, although the temperature T at the time of performing the first scanning in S622 of the print processing is stored in the RAM 312, there is not a limitation as such. For example, in S622, it is also possible to store the driving pulse P to be used for printing at the time of the first scanning, that is, the driving pulse P which is determined in S618. In this case, in S626, the driving pulse that is read out from the RAM 312 is set as the driving pulse to be used for printing at the time of the second scanning, and the processing proceeds to S630, skipping S628. Note that the driving pulse to be set as the driving pulse at the time of the second scanning is not limited to the driving pulse that is read out from the RAM 312 and may be any driving pulse which is substantially the same as the driving pulse.

(5) In the above-described embodiments, although the correspondence table 500 in which the temperatures of the print head 116 and the driving pulse numbers are associated with each other is used for determining the driving pulse in the PWM driving control, there is not a limitation as such. For example, it is also possible to use a table in which the temperatures of the print head 116 are associated with pre-pulse lengths and main-pulse lengths. Further, for example, it is also possible to use a mathematical formula capable of calculating the driving pulse number by using the above-described temperature as a variable. Alternatively, instead of the driving pulse number, it is also possible to use a mathematical formula capable of calculating the pre-pulse length and main-pulse length by using the above-described temperature as a variable.

Figure 11A:
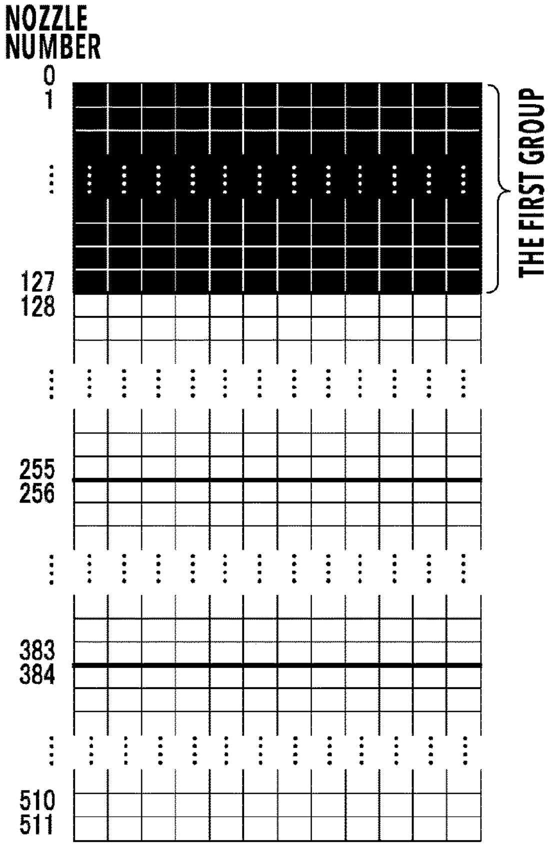
FIG. 11A to FIG. 11D are diagrams for explaining 4-section division control.
Figure 11B:
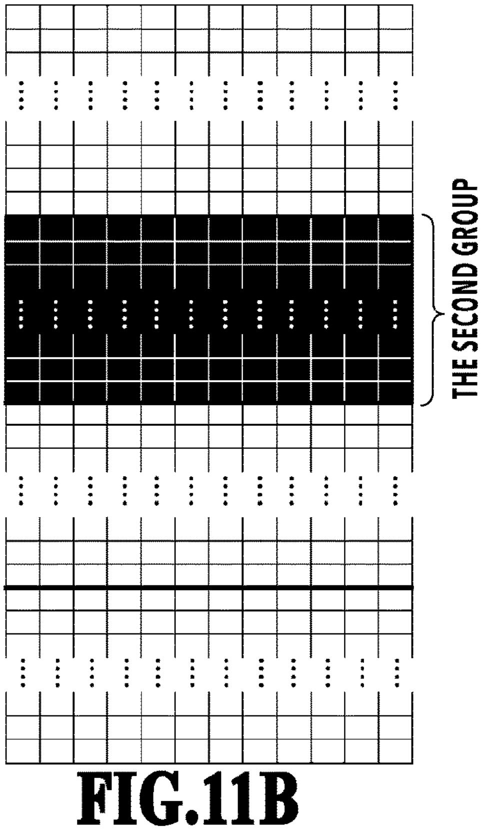
Figure 11C:
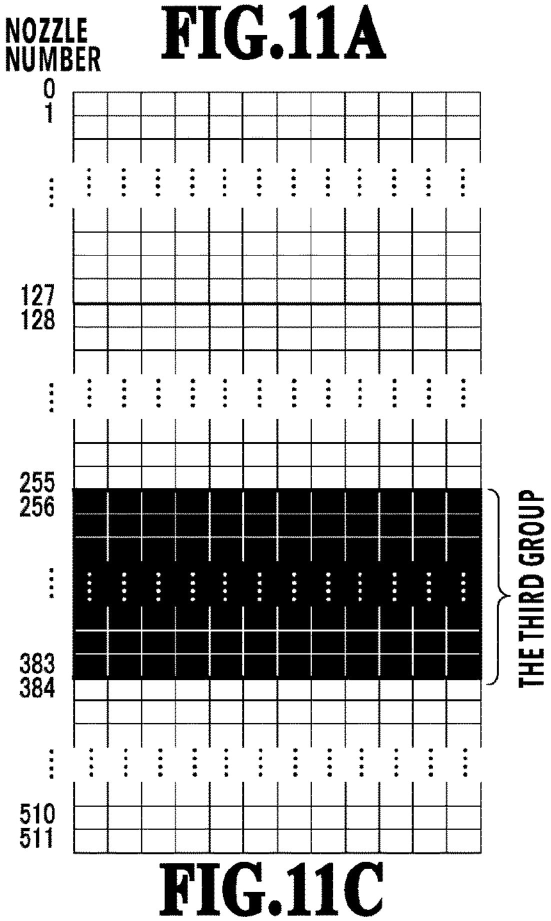
Figure 11D:
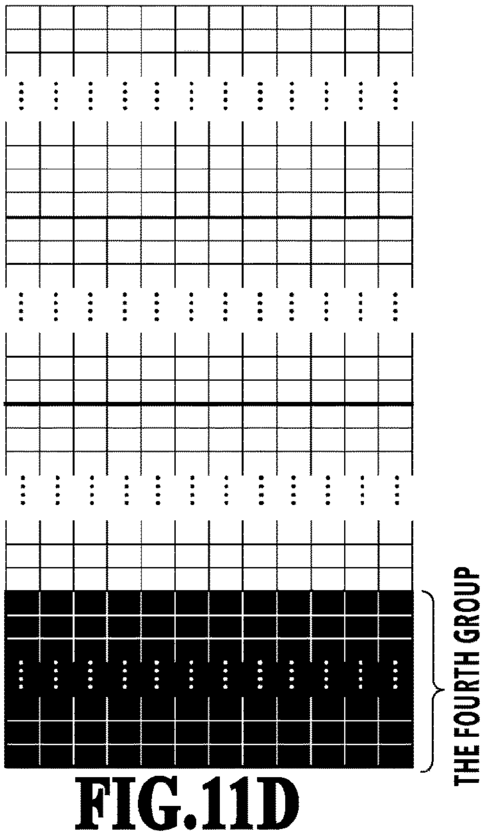

(6) In the above-described first embodiment, when high-duty printing is performed, although the printing is performed by scanning a unit print area twice (2-section division control), there is not a limitation as such That is, when high-duty printing is performed, it is also possible to perform printing by scanning a unit print area three or more times. For example, in a case of 4-section division control, that is, in a case where printing is performed by scanning a unit print area four times, the processing is as follows. In the first scanning, printing is performed by use of the first nozzle group which is the closest to the Di sensor (see FIG. 11A), and, in the second scanning, printing is performed by use of the second nozzle group which is the second closest to the Di sensor (see FIG. 11B). Further, in the third scanning, printing is performed by use of the third nozzle group which is the next closest to the Di sensor after the second nozzle group (see FIG. 11C), and, in the fourth scanning, printing is performed by use of the fourth nozzle group which is the farthest from the Di sensor (see FIG. 11D). For example, in the first scanning and the second scanning of such 4-section division control, the driving pulse is determined by use of the temperature that is detected by the Di sensor at the time of performing printing by those scanning. Further, in the third scanning and the fourth scanning, the driving pulse is determined by use of the temperature used at the time of determining the driving pulse in the first scanning or the second scanning.

(7) In the above-described first embodiment, although one-pass printing in which a unit print area is printed by printing with one time of scanning is performed in the normal printing and 2-section division control in which a unit print area is printed by printing with two times of scanning is performed in a high-duty printing, there is not a limitation as such. Specifically, it is also possible that N-pass printing in which a unit print area is printed by printing with N times of scanning is performed in the normal printing and K-section division control in which a unit print area is printed by printing with K times of scanning is performed in a high-duty printing. Note that N is an integer of 1 or more, and K is an integer greater than N.

In this case, when printing a unit print area in K times of scanning, the first printing and the second printing are included. Note that the first printing is printing which is performed by use of nozzles in the vicinity of the Di sensor, and the printing is performed based on the driving pulse that is determined by use of the temperature detected by the Di sensor. Further, the second printing is printing which is performed by use of nozzles far from the Di sensor, and the printing is performed based on the driving pulse that is determined by use of the temperature used for determining the driving pulse of the first printing.

(8) The above-described embodiments and various forms shown in (1) through (7) may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-211291, filed Dec. 21, 2020, which is hereby incorporated by reference herein in its entirety.

What is claimed is:

1. A printing apparatus comprising:

a printing unit configured with a nozzle array, in which a plurality of nozzles that eject ink to a print medium are aligned, and configured to move relative to the print medium in a direction intersecting a direction in which the nozzles are aligned;

a detection unit configured to detect a temperature of the printing unit; and a determination unit configured to determine a driving pulse for ejecting ink, based on the temperature of the printing unit, wherein the determination unit is configured such that where first printing in which printing is performed by use of a first group, which includes nozzles of the nozzle array whose distances to the detection unit are less than a first predetermined value, is executed, and thereafter second printing in which printing is performed by use of a second group, which includes nozzles of the nozzle array whose distances to the detection unit are equal to or less than the first predetermined value and are equal to or more than a second predetermined value, is executed, the determination unit (1) determines a first driving pulse for the first printing by use of a first temperature, which is detected by the detection unit before the first printing is performed, and (2) determines a second driving pulse for the second printing (a) by use of a second temperature detected before the first printing and (b) without use of a temperature detected by the detection unit after the first printing.

2. The printing apparatus according to claim 1, wherein the second temperature is the first temperature, whereby the determination unit determines the second driving pulse for the second printing by use of the first temperature.

3. The printing apparatus according to claim 1, further comprising:

an obtainment unit configured to obtain information related to ink to be ejected in a predetermined area of a unit print area which corresponds to a length of the nozzle array in an array direction, the predetermined area being printable with one time of scanning by the printing unit; and a setting unit configured to set a scan count of scanning which is performed by the printing unit and is associated with printing on the unit print area, wherein the setting unit (1) sets the scan count to a first number of times in a case where the information obtained by the obtainment unit is less than a threshold value, and (2) sets the scan count to a second number of times which is more than the first number of times in a case where the information obtained by the obtainment unit is equal to or more than the threshold value, and wherein, in the printing on the unit print area with the second number of times of scanning, the second printing is executed after the first printing.

4. The printing apparatus according to claim 3, wherein the printing on the unit print area with the first number of times of scanning is based on the driving pulse that is determined by use of the temperature detected by the detection unit when the printing is performed.

5. The printing apparatus according to claim 3, wherein the predetermined area matches the unit print area.

6. The printing apparatus according to claim 3, wherein the predetermined area is a plurality of areas obtained by dividing the unit print area.

7. The printing apparatus according to claim 3, wherein the first number of times is one.

8. The printing apparatus according to claim 3, wherein the second number of times is two.

9. The printing apparatus according to claim 1, wherein the second temperature is a temperature obtained by correcting the temperature detected by the detection unit when the second printing is performed with a correction value.

10. The printing apparatus according to claim 9, wherein the correction value is a value indicative of a difference between a temperature detected by the detection unit and a temperature of the nozzles of the second group according to temperature distribution caused by the first printing.

11. The printing apparatus according to claim 10, wherein the correction value can be found based on a relation of a heat capacity, heat conductivity, and temperature of a member configuring the printing unit.

12. The printing apparatus according to claim 1, wherein the first predetermined value matches the second predetermined value.

13. The printing apparatus according to claim 1, wherein the detection unit is installed at one end of the nozzle array of the printing unit.

14. The printing apparatus according to claim 1, wherein the first temperature is detected during a period of time after an instruction to perform the first printing is received and before the first printing is performed.

15. The printing apparatus according to claim 1, wherein in the direction in which the nozzles are aligned, the detection unit is arranged closer to the first group than to the second group.

* * * * *